(12) United States Patent
Tsukamoto et al.

(10) Patent No.: US 7,738,347 B2
(45) Date of Patent: Jun. 15, 2010

(54) OPTICAL PICKUP DEVICE AND OPTICAL DISK DRIVE

(75) Inventors: Mayumi Tsukamoto, Nagasaki (JP); Masaharu Fukakusa, Miyazaki (JP); Hiroshi Sato, Kumamoto (JP); Eizo Ono, Kumamoto (JP)

(73) Assignee: Panasonic Corporation, Osaka (JP)

( * ) Notice: Subject to any disclaimer, the term of this patent is extended or adjusted under 35 U.S.C. 154(b) by 485 days.

(21) Appl. No.: 11/850,536

(22) Filed: Sep. 5, 2007

(65) Prior Publication Data
US 2008/0062827 A1 Mar. 13, 2008

(30) Foreign Application Priority Data
Sep. 7, 2006 (JP) .............................. 2006-242461
Nov. 13, 2006 (JP) .............................. 2006-306361

(51) Int. Cl.
*G11B 7/00* (2006.01)
(52) U.S. Cl. ............................ 369/112.23; 369/112.28; 369/112.03; 369/44.23; 369/44.37
(58) Field of Classification Search ........................ None
See application file for complete search history.

(56) References Cited

U.S. PATENT DOCUMENTS

| 4,870,632 | A |   | 9/1989 | Shiono |
| 5,777,971 | A | * | 7/1998 | Choi ..................... 369/112.08 |
| 6,181,491 | B1 | * | 1/2001 | Sano et al. ............... 369/44.23 |

FOREIGN PATENT DOCUMENTS

| JP | 02-276034 | 11/1990 |
| JP | 04-129040 | 4/1992 |
| JP | 06309687 | 11/1994 |
| JP | 63-228428 | 9/1998 |
| JP | 2000-251311 | 9/2000 |

OTHER PUBLICATIONS

Japanese Office Action dated Nov. 26, 2009 with English Translation thereof.

* cited by examiner

*Primary Examiner*—Muhammad N. Edun
(74) *Attorney, Agent, or Firm*—Dickinson Wright PLLC

(57) ABSTRACT

An optical pickup device includes:
a laser source for emitting, to an optical disk, a laser beam having a wavelength $\lambda 1$ and a laser beam having a wavelength $\lambda 2$, which is longer than the wavelength $\lambda 1$;
a light receiver, for receiving laser beams that are reflected by the optical disk;
a beam splitter, for directing, to the light receiver, the laser beams reflected by the optical disk; and
an astigmatism generation element, located between the beam splitter and the light receiver, for generating the laser beams to be used for focusing control, by designating as the front of the light receiver a focal point on one of the intersecting cross sections that include the light axes of the laser beams, and by designating as the rear of the light receiver, a focal point on the other cross section,
wherein the astigmatism generation element is an optical element, which is like a Fresnel lens, whose step depth is substantially a natural number times either the wavelength $\lambda 1$ or the wavelength $\lambda 2$.

29 Claims, 19 Drawing Sheets

1: LASER SOURCE
2: PRISM
3, 4: SLOPE
5: BEAM SPLITTER
6: ASTIGMATISM GENERATION ELEMENT
6a: RING ZONE
6b: STEP
7: OPTICAL DISK
8: LIGHT RECEIVER
9: PHOTODETECTOR

1: LASER SOURCE
2: PRISM
3, 4: SLOPE
5: BEAM SPLITTER
6: ASTIGMATISM GENERATION ELEMENT
6a: RING ZONE
6b: STEP
7: OPTICAL DISK
8: LIGHT RECEIVER
9: PHOTODETECTOR

OPTICAL DISK IS NEARBY

OPTICAL DISK IS AT A DISTANCE

OPTICAL DISK IS NEARBY

OPTICAL DISK IS AT A DISTANCE

OPTICAL PICKUP DEVICE AND OPTICAL DISK DRIVE

BACKGROUND

1. Field of the Invention

The present invention relates to an optical pickup device and an optical disk drive that are mounted on an electronic apparatus, such as a personal computer or a notebook computer.

2. Description of the Related Art

Conventionally, the downsizing of electronic apparatuses, such as personal computers and notebook computers, has been expedited, and accordingly, the downsizing of optical pickup devices and optical disk drives to be mounted on these apparatuses has also been advanced.

FIG. 18 is a diagram showing the arrangement of the essential portion of the optical system of a conventional optical pickup device. A laser source 101 emits, toward an optical disk 104, a laser beam, for a DVD, having a wavelength $\lambda 1$ of about 650 nm and a laser beam, for a CD, having a wavelength $\lambda 2$ of about 780 nm. A prism 102 is formed of optical glass, for example, and internally includes a slope on which a beam splitter 103 is formed. The beam splitter 103 is a polarizing separation film, for which one property is that while a laser beam emitted by the laser source 101 is permitted to pass and continues on to the beam disk 104, a laser beam that is reflected by the optical disk 104 is reflected. The optical disk 104 is a DVD or a CD. A detection lens 105 is an astigmatism generation element having the shape of a so-called columnar lens or a cylindrical lens, and a focal length that differs for two intersecting cross sections that include light axes. A light receiver 106 has a photo detector 107 for receiving light reflected by the optical disk 104.

The laser beam having the wavelength $\lambda 1$ and the laser beam having the wavelength $\lambda 2$, both emitted by the laser source 101, pass through the beam splitter 103 and strike the optical disk 104. The laser beams reflected by the optical disk 104 are reflected by the beam splitter 103, and the reflected beams are transmitted to the detection lens 105 and then enter the light receiver 106.

FIG. 19A is an explanatory diagram for a conventional detection lens, FIG. 19B is a diagram showing the state of a spot when an optical disk is located nearby, and FIG. 19C is a diagram showing the state of a spot when an optical disk is located at a distance. In FIG. 19A, the arrangement of detection lens 105 is such that a cross section in the vertical direction is focused before beams enter the light receiver 106, and a cross section in the horizontal direction is focused after the beams enter the light receiver 106. That is, the light receiver 106 is centrally located, between the two focuses, and the shape of a spot 108 on the light receiver 106 is almost circular. When, as shown in FIG. 19B, the optical disk 104 is located near the optical pickup device, the spot 108 formed by laser beams on the light receiver 106 is extended horizontally. On the other hand, when, as shown in FIG. 19C, the optical disk 104 is located at a distance from the optical pickup device, the spot 108 formed by laser beams on the light receiver 106 is extended vertically. When the photo detectors A to D 107 are arranged in a cross shape and calculate a focus error signal FES=(A+C)−(B+D), a focus control signal can be obtained. That is, when the optical disk 104 is located nearby, the focus error signal FES>0 is obtained, and when the optical disk 104 is located at a distance, the focus error signal FES<0 is obtained, which together enable the location of the optical disk 104 to be identified.

According to (patent document 1), an optical member is additionally provided between the beam splitter 103 and the detection lens 105 in order to reduce the intensity at the center portion of the light reflected by the optical disk 104. As a result, the possibility is reduced that a track crossing signal will occur that enters a focus control signal.

Patent Document 1: JP-A-6-309687

The thickness of the detection lens, however, must be reduced in order to further provide for the downsizing of the optical pickup device and the optical disk drive. But when the detection lens is thinned, a satisfactory difference is hard to obtain between the focal lengths of the two intersecting cross sections that include the light axes, and the sensitivity of a focus control signal is reduced.

SUMMARY

Therefore, the present invention resolves these conventional problems, and has as an objective the provision of a small optical pickup device that can perform focusing control and a small optical disk drive therefor.

In order to achieve this objective, an optical pickup device of the present invention comprises:

a laser source for emitting, to an optical disk, a laser beam having a wavelength $\lambda 1$ and a laser beam having a wavelength $\lambda 2$, which is longer than the wavelength $\lambda 1$;

a light receiver, for receiving laser beams having the wavelength $\lambda 1$ and the wavelength $\lambda 2$ that are reflected by the optical disk;

a beam splitter, for directing, to the light receiver, the laser beams having the wavelength $\lambda 1$ and the wavelength $\lambda 2$ that are reflected by the optical disk; and an astigmatism generation element, located between the beam splitter and the light receiver, for generating the laser beams having the wavelength $\lambda 1$ and the wavelength $\lambda 2$, which are to be used for focusing control, by designating as the front of the light receiver a focal point on one of the intersecting cross sections that include the light axes of the laser beams, and by designating as the rear of the light receiver, a focal point on the other cross section, wherein the astigmatism generation element is an optical element, which is like a Fresnel lens, whose step depth is substantially a natural number times either the wavelength $\lambda 1$ or the wavelength $\lambda 2$.

DETAILED DESCRIPTION

First Embodiment

Figure 1A:
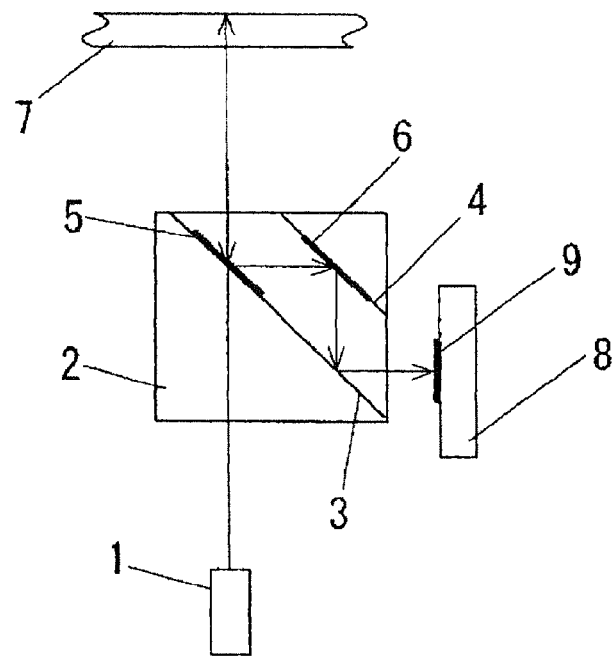
FIG. 1A is an explanatory diagram for the essential portion of the optical system of an optical pickup device according to a first embodiment of the present invention.
Figure 1B:
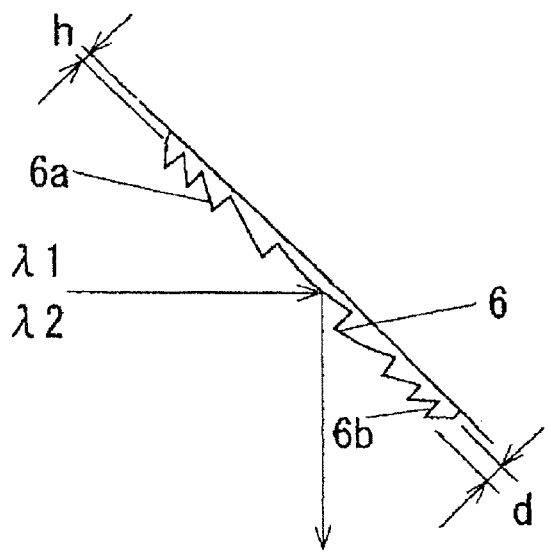
FIG. 1B is an enlarged diagram showing an astigmatism generation element in FIG. 1A.

A first embodiment of the present invention will now be described while referring to drawings. FIG. 1A is an explanatory diagram for the essential portion of the optical system of an optical pickup device according to the first embodiment, and FIG. 1B is an enlarged diagram for an astigmatism generation element in FIG. 1A. A laser beam for a DVD having a wavelength λ1 and a laser beam for a CD having a wavelength λ2, both of which are emitted by a laser source 1, enter a prism 2, pass through a beam splitter 5 formed on a slope 3, and strike an optical disk 7. When the laser beams having the wavelengths λ1 and λ2 are reflected by the optical disk 7, the reflected beams again enter the prism 2 and are reflected by the beam splitter 5, and the reflected beams enter an astigmatism generation element 6 that is formed on a slope 4. These beams are further reflected by the astigmatism generation element 6, and the reflected beams are again reflected by the slope 3, the resultant beams entering a photodetector 9 for a light receiver 8. The astigmatism generation element 6 is shaped like a Fresnel lens, and its step depth d is almost a natural number times either the wavelength λ1 or λ2.

The laser source 1 emits, toward the optical disk 7, a laser beam for a DVD having a wavelength λ1=to about 650 nm and a laser beam for a CD having a wavelength λ2=to about 780 nm. In the first embodiment, the laser source 1 is designated as a so-called double-wavelength laser source that emits the laser beams having the wavelength λ1 and the wavelength λ2 that are located near each other. However, a laser that emits a laser beam having the wavelength λ1 and a laser that emits a laser beam having the wavelength λ2 may be separately arranged. Further, a laser beam having a wavelength λ3=to about 405 nm, which is used for a Blu-ray Disc or an HD-DVD, may be concurrently employed.

Figure 2:
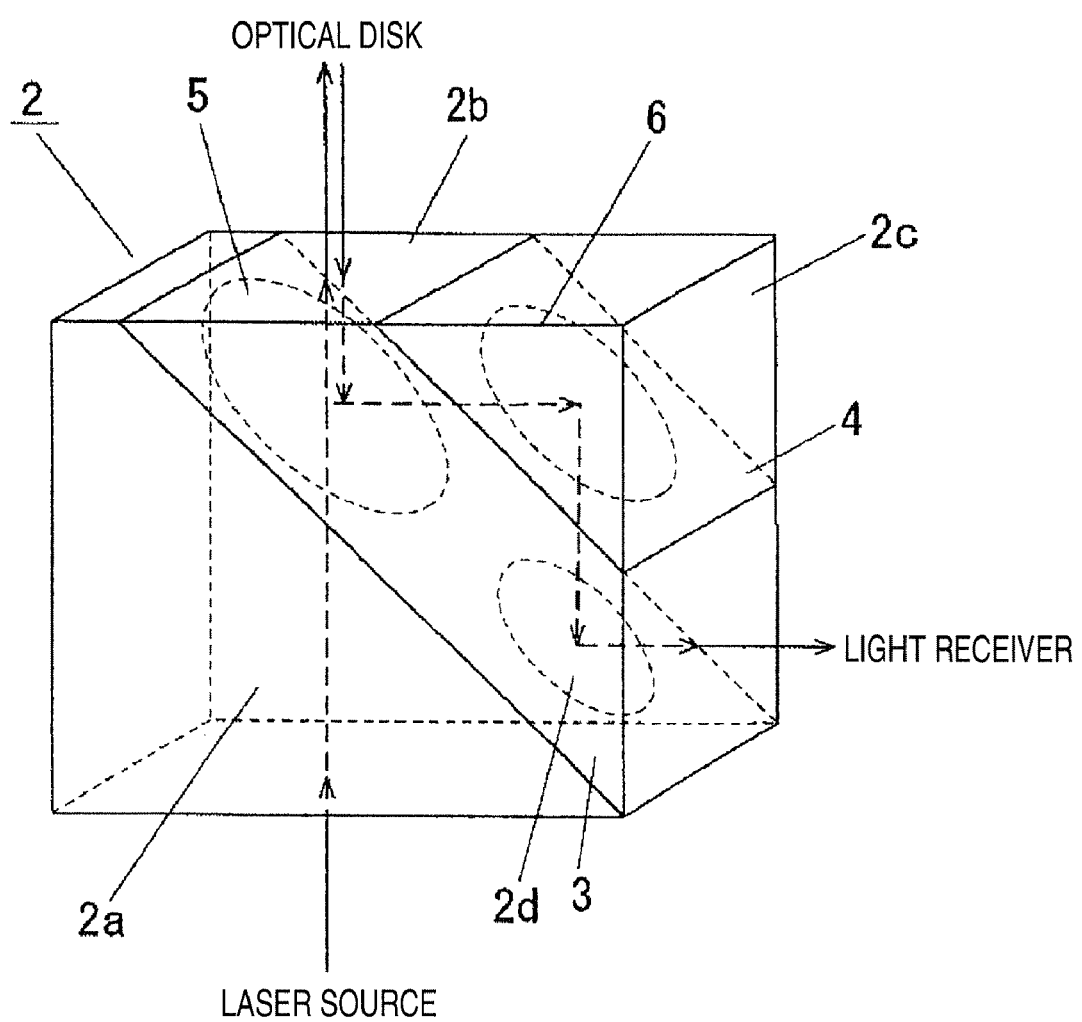
FIG. 2 is a diagram showing the structure of a prism for the first embodiment.

FIG. 2 is a diagram showing the structure of the prism 2 for the first embodiment. The prism 2 is a rectangular parallelepiped optical element that is formed of blocks 2a, 2b and 2c made of an optical glass, such as BK7. The blocks 2a and 2b are also media that permit the laser beams having the wavelengths λ1 and λ2 to pass through. The boundary between the blocks 2a and 2b corresponds to the slope 3, and the boundary between the blocks 2b and 2c corresponds to the slope 4. The slope 3 and the slope 4 are parallel, and have an inclination of almost 45° inside the prism 2, which is a rectangular parallelepiped. The beam splitter 5 and a reflection coating 2d are formed on the slope 3, while the astigmatism generation element 6 is provided for the slope 4.

The beam splitter 5 is made of a polarizing separation film, which is a dielectric multilayer film. A property of the polarizing separation film is that, based on the polarized state of a laser beam that has passed through the polarizing separation film, a laser beam emitted by the laser source 1 is permitted to pass through toward the optical disk 7, or a laser beam reflected by the optical disk 7 is reflected so as to be forwarded to the light receiver 8. In this manner, the beam splitter 5 changes the laser beam reflected by the optical disk 7, so that the laser beam is directed forward to the light receiver 8, instead of to the laser source 1.

The reflection coating 2d is a total reflection coating provided by using a metallic film or a dielectric multilayer film. The polarizing separation film may also be employed as the reflection coating 2d by extending the beam splitter 5.

Figure 3:
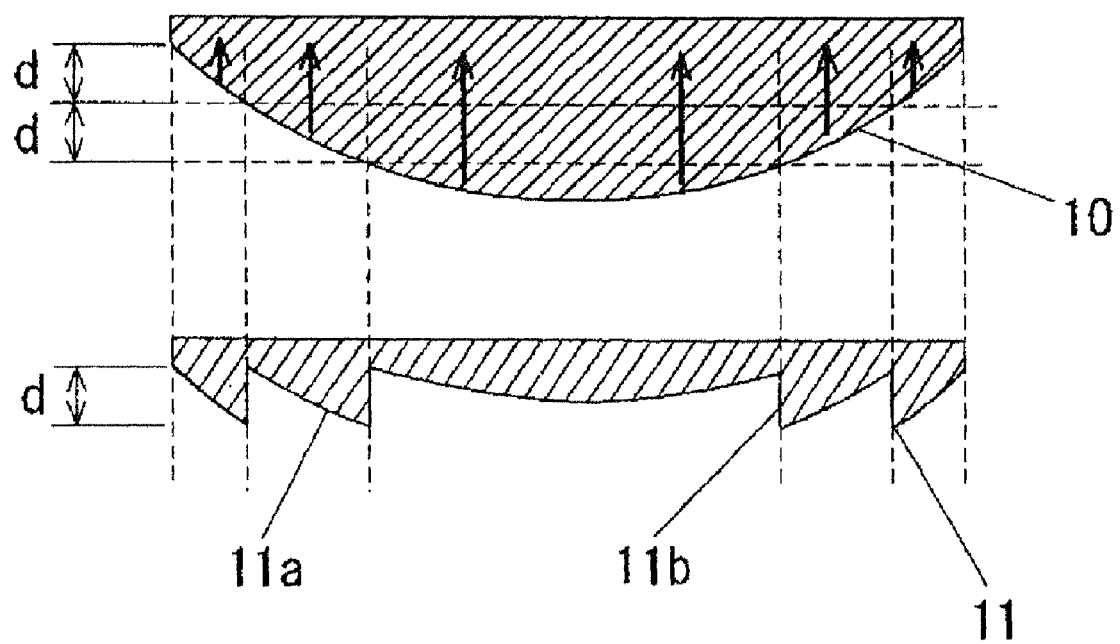
FIG. 3 is an explanatory diagram for a Fresnel lens.

As the astigmatism generation element 6, a reflection mirror of a Fresnel lens type is formed on the block 2b side of the slope 4 of the prism 2. FIG. 3 is an explanatory diagram for a Fresnel lens. A Fresnel lens 11 is a lens that is obtained by severally dividing an ordinary lens 10 to a predetermined depth d, and moving the divided segments and to reduce the overall thickness. The step depth d of the Fresnel lens 11 corresponds to the predetermined depth d used for dividing the lens 10. Further, an area between steps 11b that actually provides the refractive operation of the lens is called a ring zone 11a. In the first embodiment, a reflection mirror is employed as the astigmatism generation element 6; however, the same process may be accomplished by employing a lens.

The step depth d of the astigmatism generation element 6 is defined as a natural number times either the wavelength λ1 or λ2, while taking into account the angle at which the laser beams having the wavelengths λ1 and λ2 enter and are output by the astigmatism generation element 6 and the refractive index of optical glass, for example, that is a medium. This is because when the step depth d is a natural number times the wavelength of incident light, the phase difference before and after the step 6b becomes zero, and the light moves in the same manner as when the step 6b is not formed. When the step depth d is near the (natural number −0.5) times a wavelength, the affect produced by the step 6b is increased. So long as the value of the step depth d falls within a range of at least a natural number±0.25 times both the wavelengths λ1 and λ2, this step depth d can be employed for an astigmatism generation element. When the step depth d is within the natural number±0.25 times the wavelengths, the step depth d is regarded as being almost the natural number times the wavelengths, or as being as near the natural number times the wavelengths as possible. In the first embodiment, the step depth d is defined as one times the wavelength λ2, i.e., about 1.2 times the wavelength λ1. Since the laser beam having the wavelength λ1 affects the shape of a spot less when the value of the step depth d is slightly different from the natural number times the wavelength, the step depth d is designated as the natural number times the wavelength λ2. Therefore, since the phase difference of the laser beam having the wavelength λ2 before and after the step 6b is substantially 0, the steps are found to substantially have nearly no affect on this laser beam, and the laser beam having the wavelength λ1 is also less affected by the steps 6b because the step depth d is near the natural number times the wavelength λ1.

The actual step depth d is d=n×λ×cos θ÷η, where n is a natural number, λ is a laser wavelength, η is the refractive index of a medium and θ is an incident angle or an output angle. Specifically, n=1, the wavelength λ2 is 0.78 μm, the refractive index η of BK7 is about 1.51 around the wavelength λ1 or λ2, the incident angle or the output angle is θ=45°, and the step depth d is designated as d=0.78÷√2÷1.51=about 0.37 μm. As will be described later, the astigmatism generation element 6 is provided as a predetermined convex and concave pattern by applying, exposing and developing a resist. Therefore, when the step depth d is smaller than about 0.1 μm, the accuracy of the shape of the ring zone 6a is lowered. And when the step depth d is about 0.1 μm or greater, the shape of the ring zone 6a is at a usable level. With a step depth d of about 0.2 μm or greater, the shape of the ring zone 6a is only somewhat satisfactory, while with a step depth d of about 0.3 μm or greater, a ring zone 6a having a satisfactory shape can be obtained. However, when the step depth d is greater than about 3.0 μm, the accuracy of the step depth d is reduced. The step depth d should be equal to or smaller than about 3.0 μm to maintain the accuracy level for use. With a step depth d of about 2.5 μm or smaller, the accuracy of the step depth d is only somewhat satisfactory, while with a step depth d of about 2.0 μm or smaller, a step depth d is obtained that is satisfactorily accurate. Therefore, when a range of about 0.3 to 2.0 μm is employed for the step depth d, an accurate step depth d and a ring zone 6a having an accurate shape can be obtained. In the first embodiment, the step depth d is about 0.37 μm, which falls within the appropriate range for the accurate formation of the step depth and the accurate shaping of the ring zone 6a.

Figure 4A:
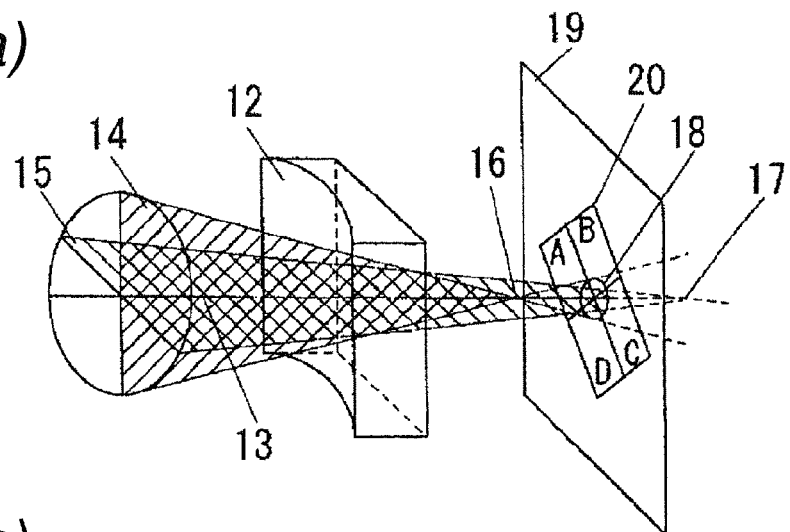
FIG. 4A is a diagram showing the functions of the astigmatism generation element and a light receiver.
Figure 4B:
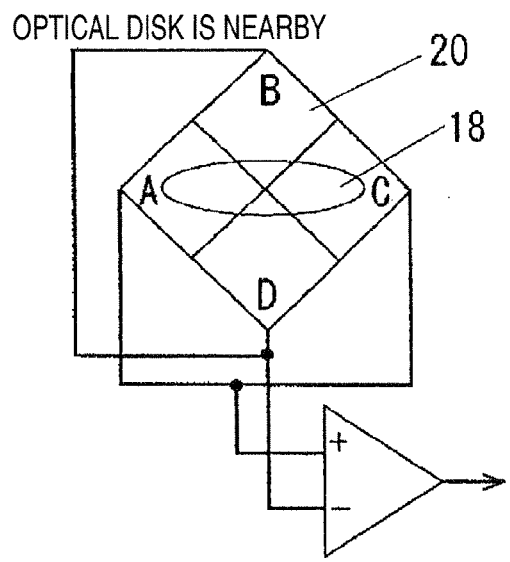
FIG. 4B is a diagram showing the state of a spot when an optical disk is located nearby.
Figure 4C:
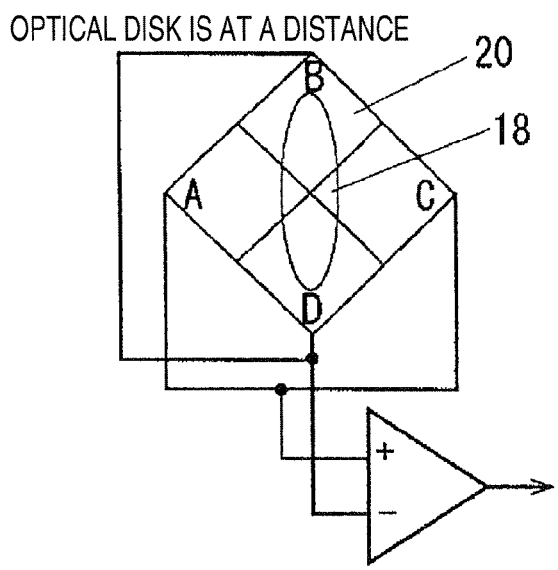
FIG. 4C is a diagram showing the state of a spot when an optical disk is located at a distance.

FIG. 4A is a diagram showing the operation of an astigmatism generation element, FIG. 4B is a diagram of a light receiver showing the state of a spot when an optical disk is located nearby, and FIG. 4C is a diagram showing the state of a spot when an optical disk is located at a distance. An astigmatism 12 is an element that produces a different focal distance between two intersecting cross sections that include a light axis 13. The astigmatism generation element 12, for example, is a so-called columnar lens, a cylindrical lens or a set of them, a cylindrical reflection mirror, a columnar reflection mirror or a set of them. In FIG. 4A, for simplification, a cylindrical lens is employed as the astigmatism generation element 12.

A laser beam reflected by the optical disk 7 is returned to the laser source 1 to be condensed. Therefore, the laser beam that enters the astigmatism generation element 12 is light that has been condensed at the laser source 1. On a vertical cross section 14 that includes a light axis 13, a laser beam is transmitted through the astigmatism generation element 12 and is condensed at a focal point 16. On the other hand, on a horizontal cross section 15 that includes the light axis 13, a laser beam is condensed at a focal point 17 located to the rear of the focal point 16 because the astigmatism generation element 12 acts as a convex lens. A light receiver 19 is arranged between the focal point 16 and the focal point 17, i.e., the focal point 16 is located in front of the light receiver 19, while the focal point 17 is located to the rear of the light receiver 19. That is, the laser beam in the direction of the cross section 14 is condensed at the focal point 16 and then spreads a little before entering the light receiver 19. While the laser beam in the direction of the cross section 15 is spread a little when entering the light receiver 19 and is then condensed at the focal point 17. Therefore, a small broad spot 18 that has a nearly circular shape is formed on the light receiver 19.

In FIG. 4A, for the light receiver 19, A to D photo detectors 20 are arranged in the shape of a window inclined at 45° in order to receive the laser beams that have the wavelengths λ1 and λ2 and that are reflected by the optical disk 7. In this embodiment, the A and C photodetectors 20 are arranged horizontally while the B and D photodetectors 20 are arranged vertically, and the A to D photodetectors 20 convert light into electric signals, the strengths of which are equivalent to the light quantities received. An electric signal obtained by the A photodetector 20 is denoted by A, an electric signal obtained by the B photodetector 20 is denoted by B, an electric signal obtained by the C photodetector 20 is denoted by C, and an electric signal obtained by the D photodetector 20 is denoted by D. In this case, a focus error signal FES, which is a focus control signal, can be obtained by calculating FES=(A+C)−(B+D).

When, as shown in FIG. 4B, the optical disk 7 is near the optical pickup device, the focal point 16 is moved nearer the light receiver 19, and the focal point 17 is moved away from the light receiver 19. Accordingly, the height of the spot 18 is reduced, while the width is increased. Therefore, the focus error signal FES>0 is established. On the other hand, when, as shown in FIG. 4C, the optical disk 7 is far from the optical pickup device, the focal point 16 is moved away from the light receiver 19, and the focal point 17 is moved nearer the light receiver 19. Accordingly, the height of the spot 18 is increased, while the width is reduced. Thus, the focal error signal FES<0 is established. That is, the focus error signal FES is a focus control signal indicating a shift in the position of the optical disk 7 in the focusing direction. Focusing control is thereafter performed, so that the focus error signal FES=0, or another predetermined value, is obtained.

It should be noted that when the step depth d differs from the natural number times the wavelength of a laser beam, the spot 18 formed on the light receiver 19 is seldom elongated. Therefore, the sensitivity of the focus error signal FES is deteriorated. In the first embodiment, since the value of the step depth d is substantially the natural number times the wavelength λ1 and also near the natural number times the wavelength λ2, a preferable spot shape can be obtained, and the sensitivity of the focus error signal FES is satisfactory.

Figure 5A:
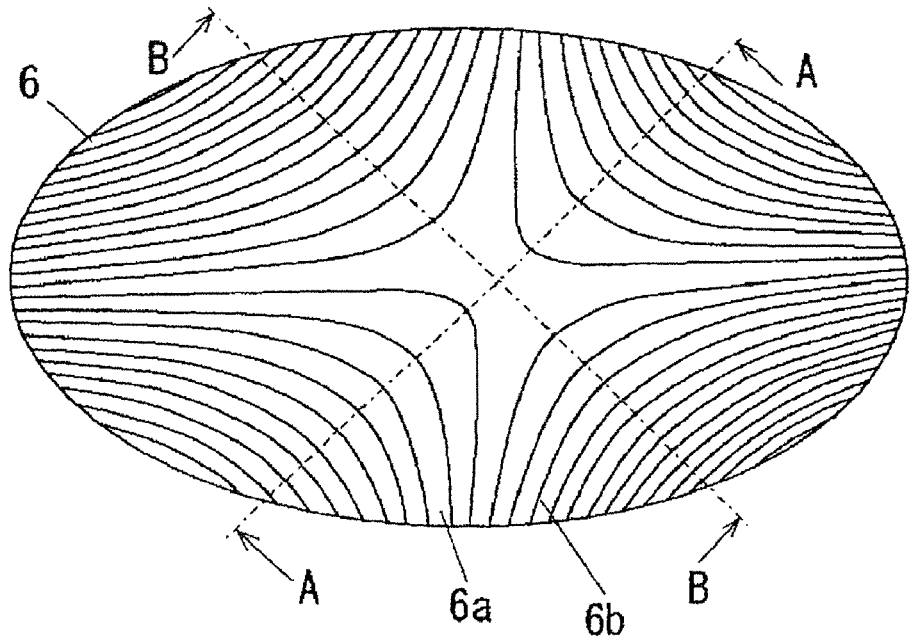
FIG. 5A is a diagram showing an example arrangement for the astigmatism generation element in the normal direction of a slope according to the first embodiment.
Figure 5B:
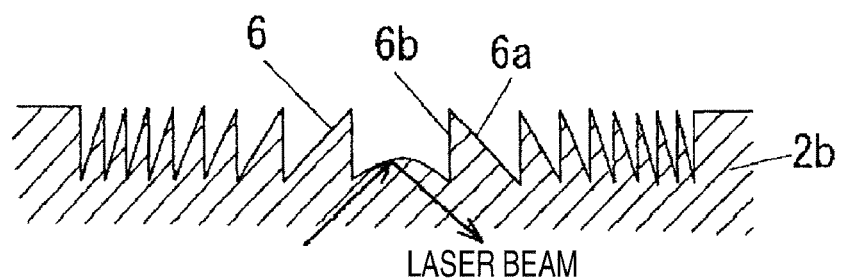
FIG. 5B is an A-A cross sectional view.
Figure 5C:
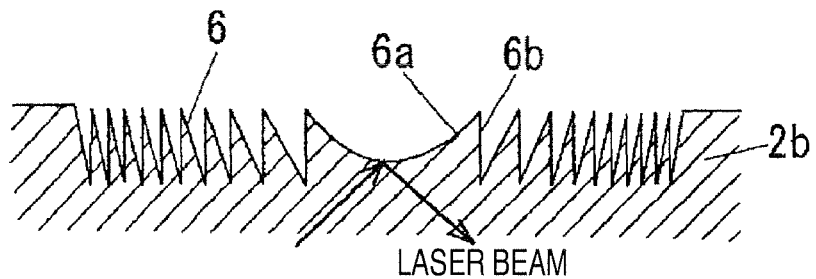
FIG. 5C is a B-B cross sectional view.

FIG. 5A is a diagram for the astigmatism generation element, viewed in the normal direction of the slope. FIG. 5B is an A-A cross sectional view, and FIG. 5C is a B-B cross sectional view. The astigmatism generation element 6 is formed on the slope 4 of the block 2b. And while referring to FIG. 5A, the vertical direction of the astigmatism generation element 6 on the paper plane corresponds to the widthwise direction of the prism 2. Further in FIG. 5A, the stripe pattern inside the astigmatism generation element 6, indicated by the solid lines, corresponds to the steps 6b, and the areas between the steps 6b correspond to the ring zones 6a. The steps 6b are distributed in the cross shaped stripe pattern, and when this pattern is cut along planes A-A and B-B, at an inclination of about 45°, the obtained cross sectional views are FIGS. 5B and 5C. In the A-A cross sectional view shown in FIG. 5B, the ring zones 6a are arranged so that they serve as concave mirrors, and in the B-B cross sectional view shown in FIG. 5C, the ring zones 6a are arranged so they serve as convex mirrors. That is, the astigmatism generation element 6 of this embodiment has a shape such that a concave mirror and a convex mirror appear every 90°. It should be noted that the A-A cut plane and the B-B cut plane have an inclination of about 45°, because a laser beam that enters the light receiver 8 is rotated 45° relative to a laser beam shown in FIG. 4. Through this process, the photodetectors 9 arranged in the light receiver 8 are rotated 45° relative to the A to D photodetectors 20 arranged in the light receiver 19, so that the A to D photodetectors 20 are arranged both lengthwise and crosswise.

The following method is employed for the fabrication of the astigmatism generation element 6. A gray scale mask is prepared that is to be exposed using a predetermined shape. The gray scale mask is a mask such that, depending on the location, the transmittance of mask portions that correspond to the ring zones 6a is sequentially changed for light having the wavelength used for exposure. When a gray scale mask is employed, an accurate step depth d and the original curved shape of a Fresnel lens can be obtained wherein the ring zones 6a are contiguous. That is, since the ring zones 6a are smoothly formed, substantially without being stepped, a satisfactory spot shape can be obtained for a laser beam projected onto the light receiver 8. Further, since only one exposure process is required, there being no need for multiple repetitions, an optical element can be obtained for which the surface shape is very similar to that of a Fresnel lens, and very closely corresponds, therefore, to the specified design.

First, a resist is applied to the surface of a plate-like block 2b, and cured. Then, ultraviolet irradiation and exposure are performed for the resist, using a gray scale, with which it is possible to form, on the resist, a predetermined convex and concave pattern consisting of the ring zones 6a and the steps 6b. Thereafter, the resist is developed, and the pattern for the convex and concave portions having the predetermined shape is secured thereto. Finally, the surface of the block 2b is etched, to physically form the concave-convex patterns in the resist. In this manner, the concave-convex patterns, the predetermined shape that consists of the ring zones 6a and the steps 6b, of the astigmatism generation element 6, can be provided in the surface of the block 2b.

Following this, a total reflection coating is deposited on the surface of the convex and concave pattern in the predetermined shape of the block 2b. The total reflection coating is a metallic film or a dielectric multilayer film. In addition, an absorption film, a dielectric multilayer film, is overlaid. Finally, the block 2b and the block 2c are adhered to each other using ultraviolet curing adhesive, for example.

The prism 2 is manufactured by the following method. The beam splitter 5 and the reflection coating 2d are formed on the surface on the slope 3 side of the plate-like block 2b, or on the surface on the slope 3 side of the plate-like block 2a. Thereafter, an ultraviolet curing adhesive is used, for example, to adhere the block 2a to the block 2b.

Following this, the plate-like blocks 2a, 2b and 2c are adhered together and a single, large block is obtained. Sequentially, then, the large block is cut into a predetermined shape and polished, to obtain the prism 2. Thereafter, of the several surfaces of the prism 2, and antireflection coating is applied to the surface through which a laser beam can enter, or through which it is output.

Figure 6:
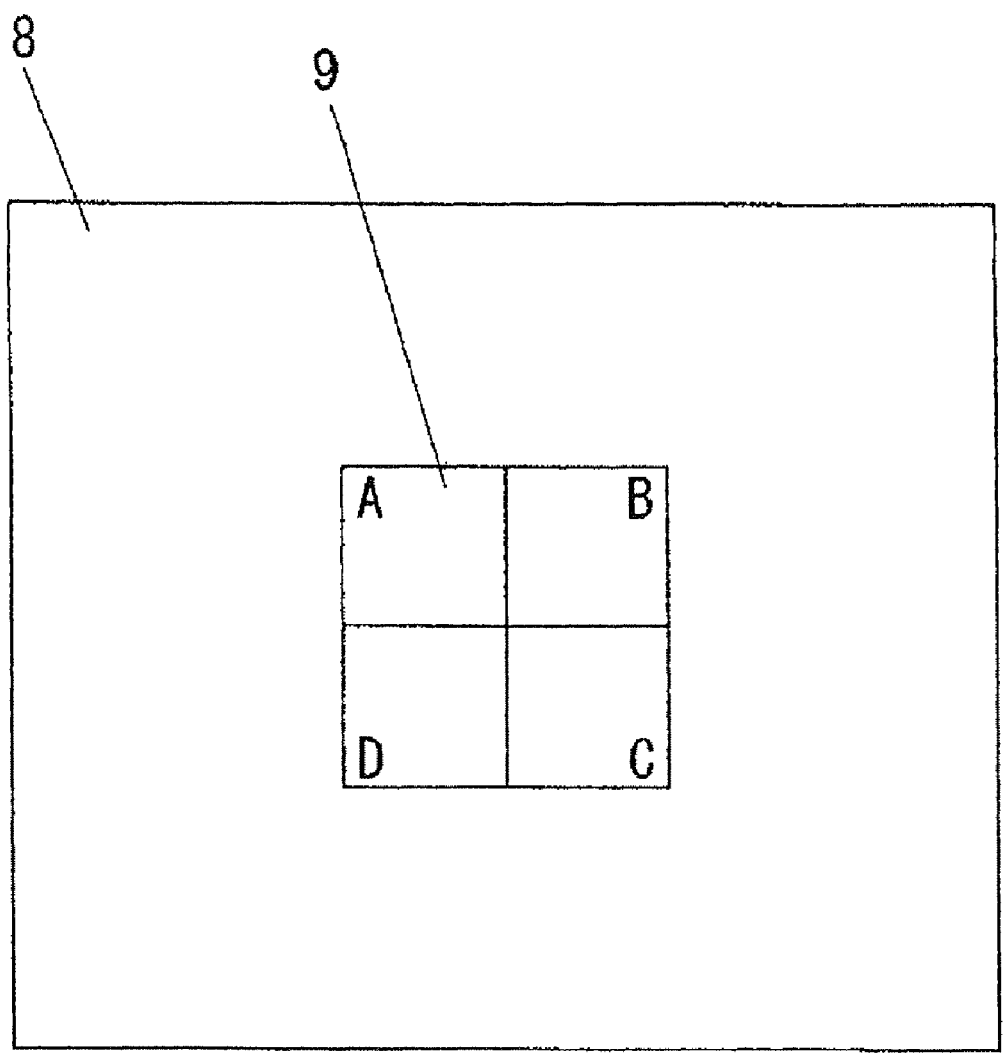
FIG. 6 is a diagram showing the light receiver according to the first embodiment.

FIG. 6 is a diagram showing the structure of a light receiver according to this embodiment. For the light receiver 8, the A to D photodetectors 9 are arranged lengthwise and crosswise the shape of a window, i.e., in a manner according to which they are rotated 45° relative to the A to D photodetectors 20 of the light receiver 19. Thus, when the optical disk 7 is thereafter moved closer or farther away, the spot of a laser beam on the light receiver 8 is extended obliquely, at an angle of 45°.

As shown in FIGS. 1A and 2, laser beams having wavelengths λ1 and λ2 that are emitted by the laser source 1, enter the prism 2, pass through the beam splitter 5 formed on the slope 3, and are directed forward to the optical disk 7. When laser beams having the wavelengths λ1 and λ2 are reflected by the optical disk 7, the laser beams enter the prism 2 and are reflected by the beam splitter 5, and the reflected beams are directed forward to the astigmatism generation element 6. The laser beams, once they have entered the astigmatism generation element 6, are converted in order to obtain different focal lengths between two intersecting cross sections that include the light axes. Then, the laser beams are reflected, the reflected beams being directed forward to the reflection coating 2d. The laser beams are again reflected by the reflection coating 2d, and the reflected beams are output from the prism 2 and enter the light receiver 8. In the photodetectors 9 of the light receiver 8, as the optical disk 7 is moved nearer or farther away, the spot shape is changed, and a focus control electric signal is generated.

Since the slope 3 is inclined at an angle of about 45°, laser beams entering the beam splitter 5 enter at an incident angle of about 45°, and when these laser beams are reflected, they depart the beam splitter 5 at angle that is also about 45°. Thus, the laser beams are directed forward almost horizontally, and enter the astigmatism generation element 6 formed on the slope 4, which is substantially parallel to the slope 3. Therefore, the incident angle of the laser beams that enter the astigmatism generation element 6 is also about 45°, and accordingly, the output angle of the laser beams reflected by the astigmatism generation element 6 is about 45°. In addition, since the incident angle relative to the reflection coating 2d and the output angle relative thereto are both about 45°, and since the laser beams are thus output from the prism 2 at substantially a right angle, almost no optical path bending due to refraction occurs.

Further, since at the incident angle and the output angle of 45° the length of an optical path is changed by multiplying by √2, the step depth d is set to 1/√2 times the wavelength. Therefore, the step depth d is 0.3 μm or greater to 2.0 μm or smaller, and accurate fabrication of the step depth d can be performed. Furthermore, since the step depth d is smaller, the period required for fabrication using the step depth 6b can be shortened, and the astigmatism generation element 6 can be manufactured at a lower cost.

In addition, since an optical path is folded between the astigmatism generation element 6 and the reflection coating 2d, the distance between the beam splitter 5 and the light receiver 8 can be shorter by a value equivalent to the distance between the astigmatism generation element 6 and the reflection coating 2d. Thus, the optical pickup device can be made more compactly.

Moreover, when a lens is employed as an astigmatism generation element 6, different refractive indexes are provided between the sides of the astigmatism generation element 6 through which a laser beam enters and through which the laser beam is output, and this difference in the refractive indexes and the incident angle relative to the ring zone 6a are employed to determine the output angle of a laser beam that passes through. When the astigmatism generation element 6 is to be arranged inside the prism 2, it is difficult for a great difference to be provided between the refractive indexes of the laser beam incident side and the output side of the astigmatism generation element 6. However, when a reflection mirror is employed, it is easy to provide for a great difference in the design, because an optical path for reflected light is determined using the angle at which a laser beam enters the ring zone 6a.

Furthermore, to prevent the need to use an adhesive, to be used, the astigmatism generation element 6 is formed directly on the surface of the block 2b, which is the medium through which pass laser beams having the wavelengths $\lambda 1$ and $\lambda 2$. In this instance, were a material such as an adhesive have to be employed, the quality of the laser beam could be adversely affected, due to slight surface differences between the block 2b and the adhesive, or by the formation of very tiny air bubbles in the adhesive. Actually, however, since the astigmatism generation element 6 is formed directly on the surface of the block 2b and a material such as an adhesive need not be used, laser beams having a preferable quality are reflected by the astigmatism generation element 6. In addition, since the concave-convex patterns, formed in the predetermined shapes on the surface of the block 2b, are employed unchanged as the actual shape of the total reflection coating that serves as the reflection mirror, a performance can be demonstrated that differs only to an extremely small degree from that which the design was intended to provide.

Further, since the astigmatism generation element 6 is formed inside the prism 2, the astigmatism generation element 6 is dust-proof, i.e., dust or other substances can not be attached to the surface of the astigmatism generation element 6.

In the astigmatism generation element 6, the ring zones 6a and the steps 6b are arranged like a cross, in the incident direction of the laser beams having the wavelengths $\lambda 1$ and $\lambda 2$ reflected by the optical disk 7. Therefore, for one of two intersecting cross sections that include the light axes, laser beams that pass through the astigmatism generation element 6 can provide power in one direction, and form a focus in the front of the light receiver 8. Furthermore, the laser beams can provide power in the opposite direction for the other cross section, and form a focus to the rear of the light receiver 8. Thus, the characteristic for the focus error signal, FES, >0 and the characteristic for the FES<0 can be easily matched.

In the first embodiment, the step depth d of the astigmatism generation element 6 has been set to about one times the wavelength $\lambda 2$, while taking into account the incident angle of a laser beam having the wavelength $\lambda 2$ and the refractive index of the block 2b. However, the multiplicand need not be limited to one, and a value about five times the wavelength $\lambda 2$ may be employed. In this case, the wavelength $\lambda 1$ is about 650 nm, while the wavelength $\lambda 2$ is about 780 nm, and for them, the ratio is about 5:6. Therefore, when the step depth d is about five times the wavelength $\lambda 2$, the step depth d can be about six times the wavelength $\lambda 1$, i.e., can be a natural number times either the wavelength $\lambda 1$ or the wavelength $\lambda 2$. In this case, phase differences before and after the steps 6b can be substantially 0, relative to both a laser beam having the wavelength $\lambda 1$ and a laser beam having the wavelength $\lambda 2$, and a spot having a satisfactory shape, which is little affected by the steps 6b, can be formed on the light receiver 8. In addition, the step depth d is about 1.83 μm, which falls within the range 0.3 to 2.0 μm, and an accurate step depth d and an accurately shaped ring zone 6a can be obtained.

So long as the step depth d is a natural number times about 1.83 μm, a spot having a satisfactory shape can be formed on the light receiver 8, both for a laser beam having the wavelength $\lambda 1$ and a laser beam having the wavelength $\lambda 2$. Especially since the minimum step depth d=about 1.83 μm and falls within the range 0.3 to 2.0 μm, an accurate step depth d and an accurately shaped ring zone 6a can be obtained. Moreover, since the step depth d is small, the astigmatism generation element 6 can be manufactured at a low cost. However, so long as an accurate step depth d can be obtained even when the step depth d is two or more times 1.83 μm, a spot having a satisfactory shape can be formed on the light receiver 8 for a laser beam having the wavelength $\lambda 1$ and for a laser beam having the wavelength $\lambda 2$.

The step depth d has been designated as a natural number times the wavelength $\lambda 2$. However, the step depth d may be a natural number times the wavelength $\lambda 1$, or may be a value located between the wavelengths $\lambda 1$ and $\lambda 2$. At this time, values should be included that fall within the ranges obtained for a natural number±0.25 times both the wavelengths $\lambda 1$ and $\lambda 2$. Since the step depth d is a value that is near a natural number times the wavelength $\lambda 1$ and the natural number times the wavelength $\lambda 2$, the astigmatism generation element 6 can be employed both for a laser beam having the wavelength $\lambda 1$ and for a laser beam having the wavelength $\lambda 2$.

In this embodiment, laser beams having the wavelengths $\lambda 1$ and $\lambda 2$ have been explained. However, the laser beams are not limited to ones having these wavelengths, and a laser beam may also be included, and employed with the ones described, that has a wavelength $\lambda 3$=about 405 nm. For example, when the step depth d is five times the wavelength $\lambda 1$ or eight times the wavelength $\lambda 3$, and when the incident angle and the output angles are 45° and the refractive index is 1.51, the step depth d will be about 1.52 μm. This falls within the range of from 0.3 to 2.0 μm, and an accurate step depth d and an accurately shaped ring zone 6a can be obtained.

In addition, in the first embodiment, the method used to form, on the surface of the block 2b, the concave-convex pattern, having the predetermined shape, for the astigmatism generation element 6 is the same as the method used to form a so-called semiconductor pattern. However, this is not the only method that can be used, and another method can be employed so long as a predetermined concave-convex pattern shaped like a Fresnel lens can be formed. As an example method, a predetermined concave-convex pattern may be formed in a die, and a material may be poured into this die pattern.

Figure 7A:
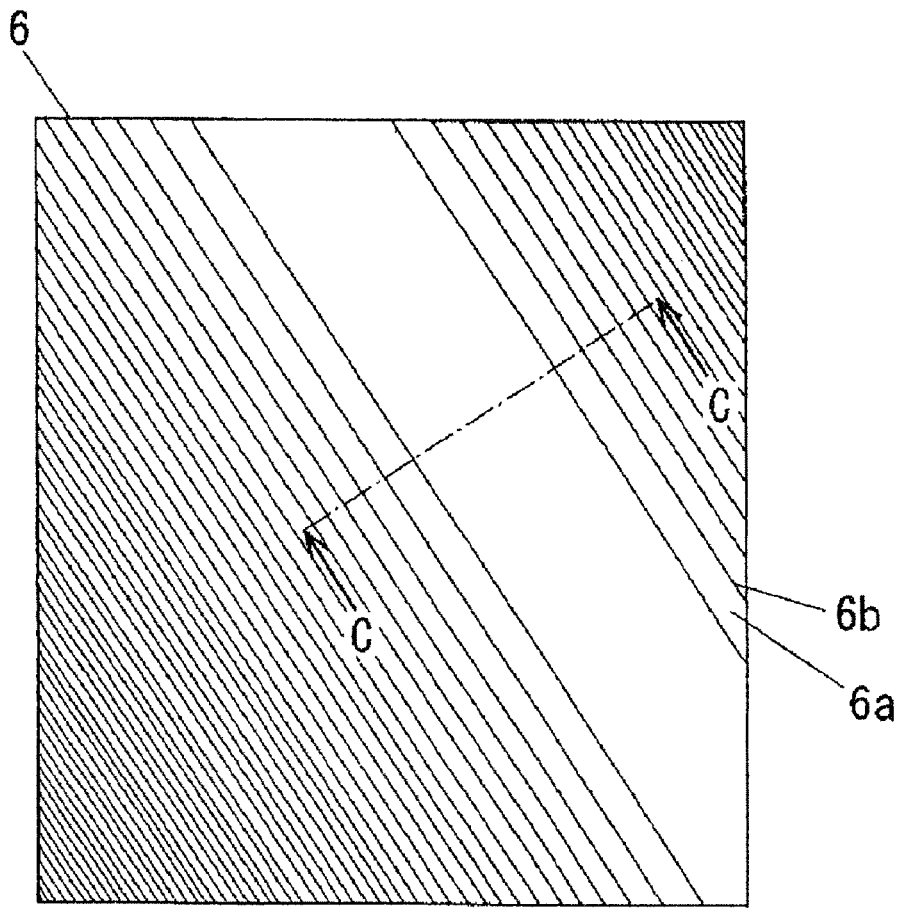
FIG. 7A is a diagram showing another example arrangement of ring zones and steps for the astigmatism generation element according to the first embodiment.
Figure 7B:
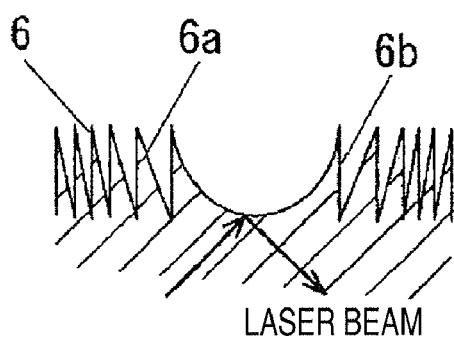
FIG. 7B is a C-C cross sectional view.

In the first embodiment, the ring zones 6a and the steps 6b of the astigmatism generation element 6 are arranged like a cross, in a direction in which laser beams having the wavelengths $\lambda 1$ and $\lambda 2$ are reflected by the optical disk 7 and are entered. However, the shape for the arrangement is not limited to the cross. FIG. 7A is a diagram showing another example arrangement for the ring zones and the steps of the astigmatism generation element according to the first embodiment, and FIG. 7B is a C-C cross sectional view. The steps 6b are formed almost linearly, and the ring zones 6a are shaped like a convex mirror in the transverse direction of the steps 6b, i.e., are shaped like a cylindrical reflection mirror. When the astigmatism generation element 6 has such a shape, this element acts to generate astigmatism. In this case, since a two dimensional ring zone shape is required instead of a three dimensional cross shape, the astigmatism generation element 6 can be easily designed.

The Fresnel lens surface of the astigmatism generation element 6, which is formed on the surface of the block 2b, a medium, can be deformed simply by contacting another object, which can cause the shape of the element to collapse. Thus, should the reflection face contact the block 2c, because the blocks are pressed too closely together for adhesion, deformation of the surface of the reflection face can occur. To avoid such contact, it is preferable that the surface area of the block 2b that corresponds to the portion of the astigmatism generation element 6 that reflects laser beams having the wavelengths λ1 and λ2 be lower, as shown in FIG. 1B, by a height h than the surfaces of peripheral areas. As a result, the shape of the reflection face formed on the block 2b can be used, without being deformed, as the reflection surface shape for the astigmatism generation element 6. This structure, including the height h, can also be provided by using a gray scale mask.

As described above, according to the first embodiment, since a Fresnel lens is employed for the astigmatism generation element 6, the thickness of the element 6 can be reduced, and the optical pickup device can be compactly made. Furthermore, although the device is small, appropriate sensitivity can be provided for a focus control signal. In addition, since the step depth d is designated as being almost a natural number times the wavelength λ1 or λ2, a laser beam, the wavelength of which is employed to calculate the step depth d, can form a preferably shaped spot 18 on the light receiver 8 after having passed through the astigmatism generation element 6.

Second Embodiment

Figure 8:
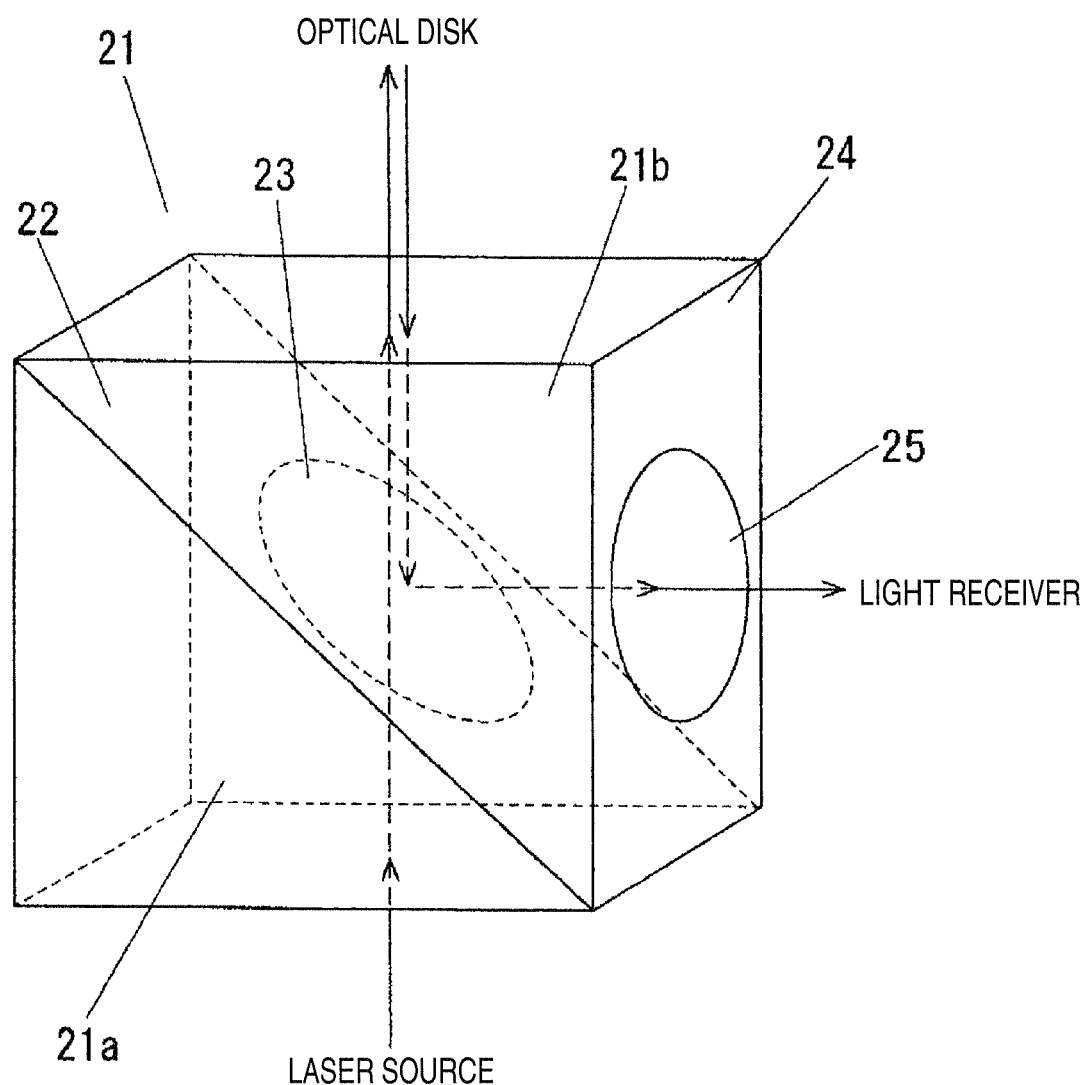
FIG. 8 is a diagram showing an example structure of a prism according to a second embodiment of the present invention.
Figure 9:
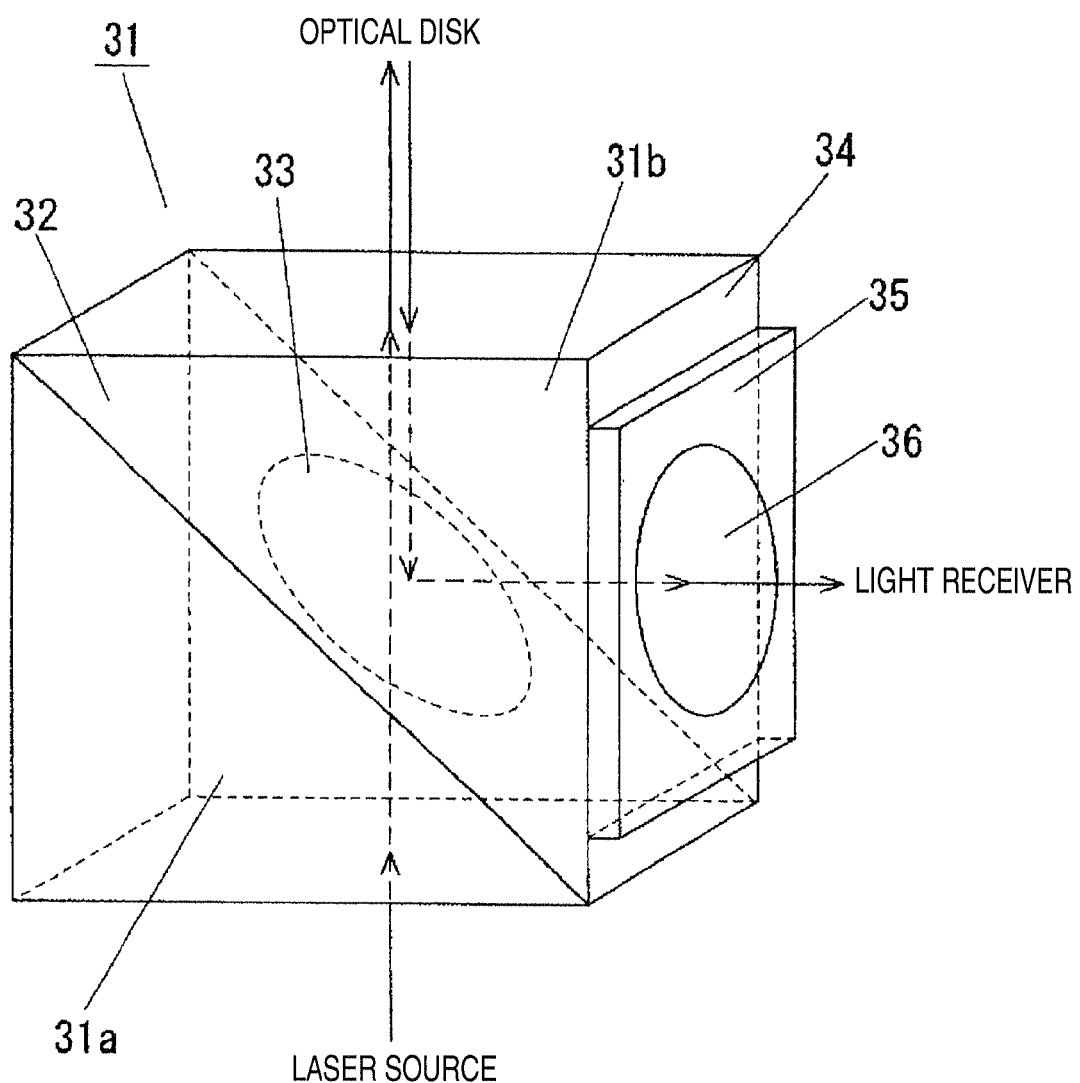
FIG. 9 is a diagram showing another example structure of the prism according to the second embodiment.

A second embodiment of the present invention will now be described while referring to the drawings. FIG. 8 is a diagram showing an example structure for a prism according to the second embodiment, and FIG. 9 is a diagram showing another example structure for the prism according to the second embodiment. In the second embodiment, an astigmatism generation element is arranged outside a prism. Since a laser source, an optical disk and a light receiver for the second embodiment are the same as those for the first embodiment, the explanation used for the first embodiment will be quoted, and the reference numbers provided for them will also be employed.

While referring to FIG. 8, a prism 21 is formed by bonding triangular pole blocks 21a and 21b together along slopes 22. The blocks 21a and 21b are made of an optical glass such as BK7. A beam splitter 23, which is a polarizing separation coating made of a dielectric multilayer film, is deposited on one of the slopes 22. Further, an astigmatism generation element 25 is formed on the prism 21, on a side face 24, which is one of the side faces of the block 21b. In the first embodiment, the astigmatism generation element 6 is a reflection mirror having the shape of a Fresnel lens, whereas in the second embodiment, the astigmatism generation element 25 is a Fresnel lens.

In this case, a step depth d is represented by $d = n \times \lambda \div (\eta 2 - \eta 1) \div \cos \theta$, where n is a natural number, λ is a laser wavelength, η1 is the refractive index of a medium outside a lens, η2 is the refractive index of a medium inside the lens, and θ is an incident angle. Therefore, the step depth d is calculated as $d = 1 \times 0.78 \div (1.51 - 1) =$ about 1.53 μm, when n=1, the wavelength λ2 is 0.78 μm, the refractive index η2 of BK7 that is the medium inside the lens is 1.51, the refractive index η1 of air that is the medium outside the lens is 1, and the incident angle θ is 0°. The step depth d is 0.3 μm or greater to 2.0 μm or smaller, and an accurate step depth d and an accurate ring zone shape can be obtained. The step depth d is one times the wavelength λ2, while taking into account the refractive index 1.51 of BK7, which is the block 21b. In this case, the step depth d is 1.2 times the wavelength λ1, which is near the natural number times the wavelength λ1. Therefore, the laser beam having the wavelength λ1 is very little affected by the steps, and the laser beam having the wavelength λ2 is also less affected. Thus, a spot having a satisfactory shape can be formed both for the laser beams having the wavelength λ1 and the laser beam having the wavelength λ2.

When the laser beams having the wavelengths λ1 and λ2 are emitted by a light source 1 located at the bottom in FIG. 8, these laser beams pass through a beam splitter 23 and beyond to an optical disk 7 located above in FIG. 8. The laser beams are reflected by the optical disk 7 and the reflected beams are thereafter reflected by the beam splitter 23. These reflected beams then pass through the astigmatism generation element 25 and enter a light receiver 8.

The astigmatism generation element 25, which is a Fresnel lens formed on the side face 24 of the prism 21, is thinner than the ordinal lens, so that the thickness can be ignored. Thus, the distance between the prism 21 and the light receiver 8 can be reduced.

Further, since the prism 21 internally includes only the slope 22 on which the beam splitter 23 is formed, the size of the prism 21 can be smaller than when the astigmatism generation element 6 is formed.

Furthermore, since the astigmatism generation element 25 is formed as a lens, an optical path can be provided that is not bent.

While referring to FIG. 9, a prism 31 is formed by bonding together triangular pole blocks 31a and 31b along slopes 32. The blocks 31a and 31b are made of an optical glass, such as BK7. A beam splitter 33, which is a polarizing separation coating made of a dielectric multilayer film, is deposited on the slope 32. This structure of the prism 31 is the same as the structure of the prism 21.

An astigmatism generation element 36 is formed on the surface of an optical substrate 35, which is adhered to a side face of the block 31b of the prism 31. The astigmatism generation element 36 is a Fresnel lens, and the optical substrate 35 is made of an optical glass, such as BK7.

The laser beams having the wavelengths λ1 and λ2, which are emitted by the laser source 1 located at the bottom in FIG. 9, pass through the beam splitter 33, and are output to the optical disk 7 located above in FIG. 9. The laser beams are reflected by the optical disk 7 and the reflected beams are thereafter reflected by the beam splitter 33. These reflected beams then pass through the astigmatism generation element 36 and enter the light receiver 8.

Since the prism 31 of a superior quality is bonded to the optical substrate 35 where the astigmatism generation element 36 of a superior quality is formed, the prisms 31 can be produced with higher yields than the prisms 21.

As described above, also for the second embodiment, when a Fresnel lens is employed as the astigmatism generation element 25 or 36, a thin astigmatism generation element 25 or 36 can be provided, and a compact optical pickup device can be produced. Further, although the device is small, a satisfactory sensitivity can be obtained for a focus control signal. Furthermore, when the step depth d is designated as being almost a natural number times either the wavelength λ1 or λ2, a spot 18 having a preferable shape can be formed on the light receiver 8 by a laser beam that has passed through the astigmatism generation element 25 or 36, and the wavelength that is employed for setting the step depth d.

Third Embodiment

Figure 10:
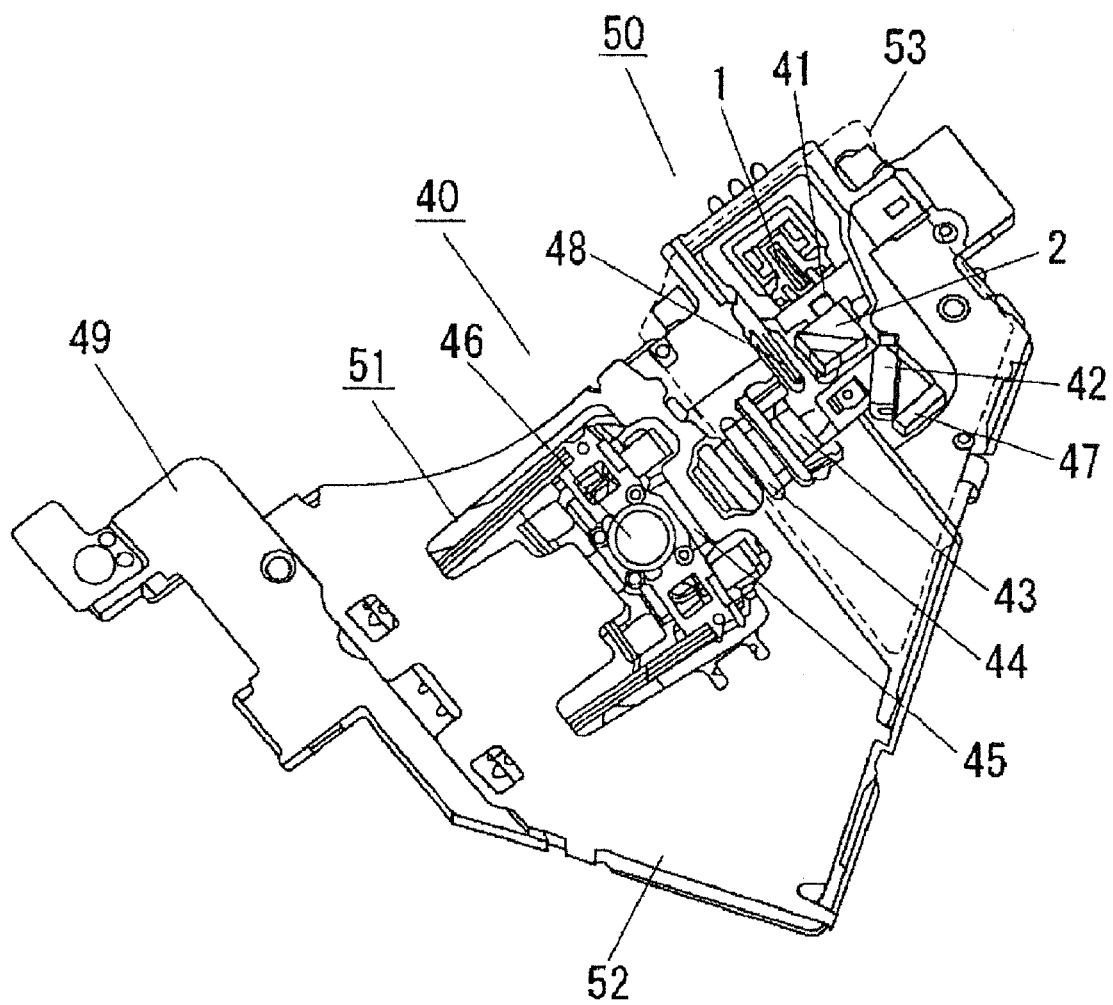
FIG. 10 is a diagram showing the structure of an optical pickup device according to a third embodiment of the present invention.
Figure 11:
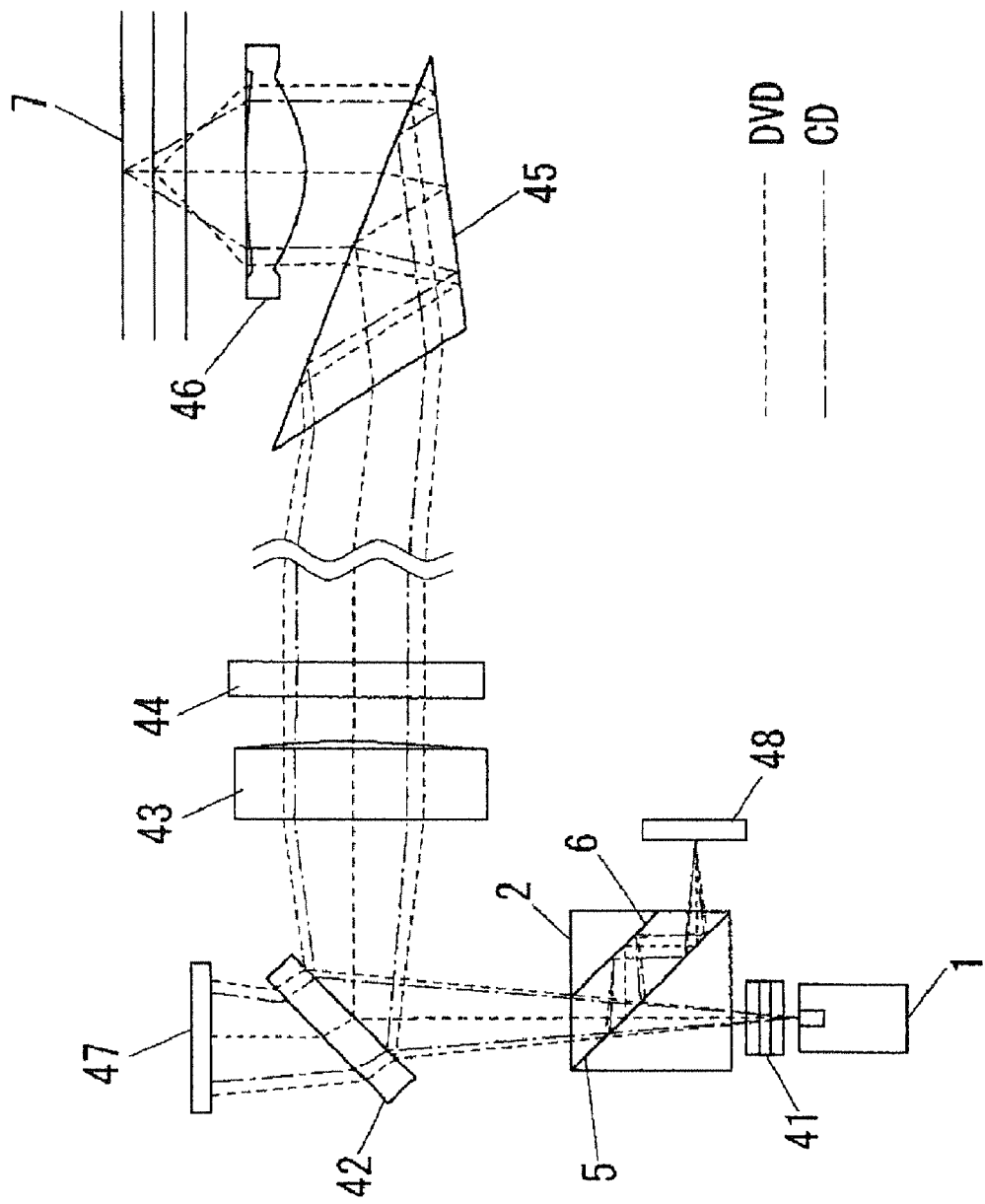
FIG. 11 is a diagram showing the structure of the optical system of the optical pickup device of the third embodiment.

A third embodiment of this invention will now be described while referring to the drawings. FIG. 10 is a diagram showing the structure of an optical pickup device according to the third embodiment, and FIG. 11 is a diagram showing the structure of the optical system of the optical pickup device for the third embodiment. An optical pickup device 40 for the third embodiment is a specific example of the optical pickup device explained in the first embodiment. Since a laser source 1 and a prism 2 that includes a beam splitter 5 and an astigmatism generation element 6 are the same as those in the first embodiment, the description employed for the first embodiment will be quoted, and the reference numerals provided for them will be employed. Furthermore, the prism 2 may be replaced with the prism used for the second embodiment, or with a prism for a fifth embodiment that will be described later.

The optical pickup device 40 is constituted by arranging various parts on a base 49. The base 49 is the frame of the optical pickup device 40. The base 49 is made of an alloy, such a Zn alloy or a Mg alloy, or a hard resin material, and an alloy material with which rigidity is easily obtained is preferable. On the base 49, fittings are provided at predetermined locations to arrange various parts.

A diffraction element 41 includes a first diffraction grating and a second diffraction grating. The first diffraction grating diffracts a DVD laser beam having a wavelength $\lambda 1$ to obtain zero-order light, ±first-order light, . . . , or permits a CD laser beam having a wavelength $\lambda 2$ to pass unchanged. The second diffraction grating permits the laser beam having the wavelength $\lambda 1$ to pass unchanged, or diffracts a laser beam having a wavelength $\lambda 2$ to obtain the zero-order light, the ±first-order light . . . . Of the zero-order light, the ±first-order light, . . . obtained by diffraction, the zero-order light and the ±first-order light are employed for tracking control. The zero-order light is also called a main beam, and the ±first-order light is also called a side beam or a sub-beam.

The quantity of the zero-order light obtained by diffraction is determined based on the wavelength $\lambda$ of a laser beam and the refractive index and the depth of the diffraction grating. The first diffraction grating can be provided by selecting a diffraction grating depth such that the zero-order light is almost 100% of the diffracted light of a laser beam having the wavelength $\lambda 2$. Further, the second diffraction grating can be provided by selecting a diffraction grating depth such that the zero-order light is almost 100% of the diffracted light of a laser beam having the wavelength $\lambda 1$.

The diffraction elements may include the following diffraction gratings. Specifically, a diffraction grating includes a concave-convex member that forms the rough surfaces of the diffraction grating and a filling member that fills the rough surfaces, and a material for absorbing light in a predetermined wave band is contained in either the concave-convex member or the filling member. In this case, the wavelength dependency of the refractive index of the material is increased in the vicinity of the predetermined wave band that performs light absorption. Therefore, the wavelength dependency appears in the difference in the refractive index between the concave-convex member and the filling member. In a case where a wavelength for which the refractive index between the concave-convex member and the filling member is zero, a laser beam having this wavelength passes through the diffraction grating. However, in a case where a wavelength for which the difference in the refractive indexes between the convex-concave member and the filling member is not zero, the diffraction grating diffracts the laser beam. For the first diffraction grating, the refractive indexes between the concave-convex member and the filling member differ for the wavelength $\lambda 1$, while the refractive indexes between them are the same for the wavelength $\lambda 2$. For the second diffraction grating, the refractive indexes between the concave-convex member and the filling member are the same for the wavelength $\lambda 1$, while the refractive indexes between them are different for the wavelength $\lambda 2$.

A reflection mirror 42 is used to bend an optical path in order to reduce the size of an optical pickup device 40. The reflection mirror 42 is made, for example, of optical glass or optical plastic, and a polarizing separation coating is deposited on the face that is to be irradiated by a laser beam. The polarizing separation film is, for example, a dielectric multilayer film, a property of which is that most of a P polarized laser beam is reflected and only part of this beam is permitted to pass, while an S polarized laser beam is, substantially, totally reflected.

A collimating lens 43 changes the laser beams having the wavelengths $\lambda 1$ and $\lambda 2$, emitted by the laser source 1, from divergent light into parallel light, and outputs the parallel light to an optical disk 7. The collimating lens 43 also changes, into convergent light, parallel light that is reflected by the optical disk 7 and is received after passing through an objective lens 46, and transmits the convergent light to a prism 2. The collimating lens 43 is made, for example, of optical glass or optical plastic.

A quarter-wave plate 44 changes, into circularly polarized light, P polarized laser beams having wavelengths $\lambda 1$ and $\lambda 2$ that are emitted by the laser source 1. The quarter-wave plate 44 also changes, into S polarized light perpendicular to P polarized light, the circularly polarized laser beam that is reflected by the optical disk 7.

A path elevating prism 45 is a prism for elevating an optical path, so that the light axis of a laser beam that initially is almost parallel to the optical disk 7 is bent, substantially at a right angle, towards the optical disk 7. A laser beam that enters the path elevating prism 45 is reflected therein multiple times, and is output at a right angle to irradiate the optical disk 7. A path elevating mirror may also be employed as the path elevating prism 45.

An objective lens 46 is a bifocal lens made of optical glass or optical plastic. Laser beams, which are changed into nearly parallel light by the collimating lens 43, are condensed by objective lens 46 to form focal points on the recording face of the optical disk 7, in accordance with their respective wavelengths. For the objective lens 46, a set consisting of a condensing lens and a Fresnel lens or a hologram lens, or a system for operating an aperture limitation means for a DVD condensing lens while a CD is being played, may also be employed in order to resolve a difference in the thickness of an optical disk 7 and in the numerical size of an aperture.

A fore-light monitor 47 receives laser beams having the wavelengths $\lambda 1$ and $\lambda 2$, and converts them to obtain and output electric signals that are consonant with the light quantities of the beams. The signals output are employed to control the laser beams emitted by the laser source 1.

Figure 12:
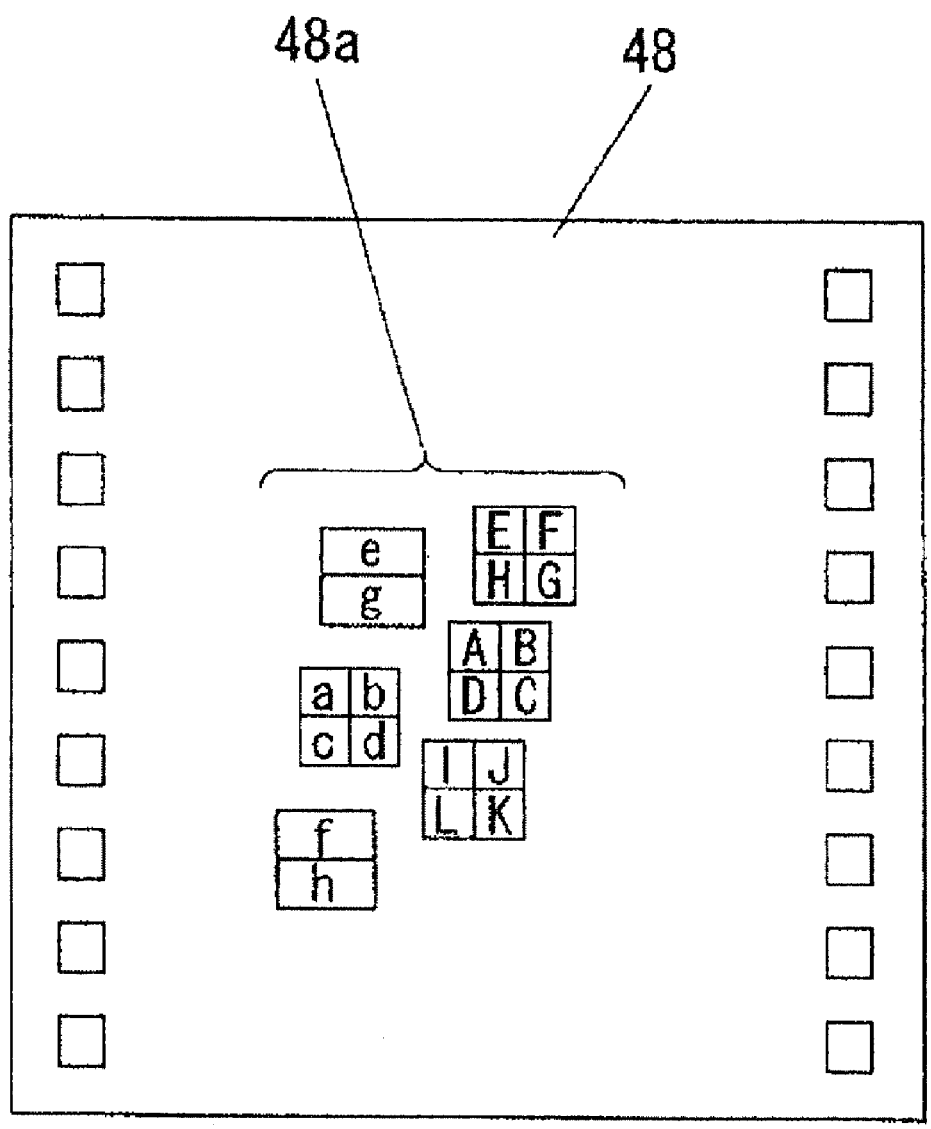
FIG. 12 is a diagram showing the structure of a light receiver for the third embodiment.

FIG. 12 is a diagram showing the structure of a light receiver for the third embodiment. A light receiver 48 includes A to L and a to h photodetetors 48a. The A to L photodetectors 48a receive a DVD laser beam having a wavelength $\lambda 1$, and the a to h photodetectors 48a receive a CD laser beam having a wavelength $\lambda 2$. The main beam enters the A to D and a to d photodetectors 48a, and side beams enter the E to L and e to h photodetectors 48a. The A to D photodetectors 48a and the a to d photodetectors 48a in FIG. 12 correspond to the A to D photodetectors 9 in FIG. 6.

Assume that DVD electric signals received and converted by light receiving portions A, B, C, D, E, F, G, H, 1, J, K and L are denoted by A, B, C, D, E, F, G, H, 1, J, K and L. And assume that CD electric signals received and converted by light receiving portions a, b, c, d, e, f, g and h are denoted by a, b, c, d, e, f, g and h.

DVD focus error signals FES are FES=(A+C)−(B+D) for a DVD-ROM and a DVD±R/RW; and FES={(A+C)−(B+D)}+

Kt×{(E+I+G+K)−(H+L+F+J)} for a DVD-RAM. In this case, Kt is a constant that is determined in consonance with the operation setup.

A CD focus error signal FES is FES=(a+c)−(b+d) for a CD-R/RW/ROM.

DVD tracking error signals TES are: TES=ph(A, D)−ph(B, C) for a DVD-ROM; and TES={(A+B)−(C+D)}−Kt×{(E+I+F+J)−(G+K+H+L)} for a DVD±R/RW and a DVD-RAM. In this case, ph(X, Y) indicates a voltage obtained by converting a detected phase difference between X and Y. A tracking error signal TES is a signal indicating a shift in the track position of a spot.

CD tracking error signals TES are: TES={(a+b)−(c+d)}−Kt×{(e+f)−(g+h)} for a CD-R/RW/ROM; and TES=ph(a, d)−ph(b, c) for a CD-ROM. Normally, the first method, which enables more stable tracking control, is employed. However, in a case wherein an inferior CD-ROM is being played for which the pit height does not conform to the standard, a tracking error signal TES may not be output properly using the first method. In such a case, the second method is used to output properly a tracking error signal TES. Therefore, the second method can be employed as a spare tracking control method. As described above, since tracking control can be performed even when an inferior disk is being played that does not conform to the tracking control standard, the optical disk drive can cope with a greater variety of optical disk 7 types.

To provide a laser module 50, the laser source 1, the diffraction element 41, the prism 2 and the light receiver 48 are integrally fixed to a part of the laser module 50 called a coupling base. Then, the coupling base of the laser module 50 is secured to the base 49. Since the parts are assembled as the laser module 50, and since this laser module 50 is fixed to the base 49, the accuracy with which the individual parts are assembled and the stability of the time-transient change can be increased. The prism 2 and the light receiver 48 are arranged near each other in the laser module 50. Further, the reflection mirror 42, the collimating lens 43, the quarter-wave plate 44, the path elevating prism 45 and the fore-light monitor 47 are fixed to the base 49 directly, or by using fittings. The objective lens 46 is secured to the lens holder of an objective lens driver 51 that is secured to the base 49. The lens holder is supported by the main body of the objective lens driver 51, and can be freely moved in the focusing direction and in the tracking direction. Based on a signal that is generated by the main body of the optical disk drive, in accordance with a focus control signal or a tracking control signal, the objective lens driver 51 moves the objective lens 46 either in the focusing direction or the tracking direction.

Covers 52 and 53 are attached to the main body of the optical pickup device 40 to protect a variety of parts that are arranged for the optical pickup device 40. In FIG. 10, the cover 53, indicated by a broken line, is removed, so that the prism 2 and the other parts can be seen.

An optical path will now be described. The laser beams having wavelengths λ1 and λ2 that are emitted by the laser source 1 are P polarized light, and enter the diffraction element 41. The laser beam having the wavelength λ1 is divided into a main beam and a side beam by the first diffraction grating of the diffraction element 41. The laser beam having the wavelength λ2 is divided into a main beam and a side beam by the second diffraction grating of the diffraction element 41. The laser beams having the wavelengths λ1 and λ2, which have been divided into the main beams and the side beams, enter the prism 2. Since the polarizing separation film of the beam splitter 5 is so formed that P polarized laser beams are permitted to pass unchanged, the P polarized laser beams are transmitted through the beam splitter 5 of the prism 2 and enters the reflection mirror 42. Since the laser beams are P polarized light, most of each beam is reflected by the polarized separation film of the reflection mirror 42, and the reflected light is directed forward to the optical disk 7. On the other hand, part of each beam is transmitted through the polarizing separation film and enters the fore-light monitor 47. The laser beams that enter the fore-light monitor 47 are converted into electric signals, consonant with the light quantity, which are thereafter employed to provide output control for the laser beams emitted by the laser source 1.

The laser beams reflected by the polarizing separation film of the reflection mirror 42 enter the collimating lens 43. The laser beams, which currently are divergent light, are converted into parallel light by the collimating lens 43, and the parallel light enters the quarter-wave plate 44. The laser beams, which currently are P polarized light, are then converted into circularly polarized light by the quarter-wave plate 44, and the circularly polarized light is transmitted to the path elevating prism 45. The path elevating prism 45 changes the direction of the laser beams to one perpendicular to the optical disk 7, and the laser beams then enter the objective lens 46. Thereafter, the laser beams are converted by the objective lens 46 into beams that are condensed on the optical disk 7.

When the DVD laser beam having the wavelength λ1 and the CD laser beam having the wavelength λ2 are reflected by the optical disk 7, they are converted into almost parallel light by the objective lens 46, and the parallel light enters the path elevating prism 45. The direction of the parallel light is changed by the path elevating prism 45 to one almost parallel to the face of the optical disk 7, and the resultant laser beams enter the quarter-wave plate 44. The laser beams are converted by the quarter-wave plate 44 from the circularly polarized light to S polarized light, and the S polarized light enters the collimating lens 43. The laser beams are changed into convergent light by the collimating lens 43, and the convergent light enters the reflection mirror 42. The laser beams, which are S polarized light, are almost totally reflected by the polarizing separation film of the reflection mirror 42, and the reflected light enters the prism 2.

Since the polarizing separation film of the beam splitter 5 is so formed that S polarized laser beams are reflected, the S polarized laser beams are almost totally reflected, and the reflected light enters the astigmatism generation element 6. The laser beams are reflected while astigmatism is provided by the astigmatism generation element 6, and thereafter, the laser beams are transmitted to the photodetectors 48a of the light receiver 48. The photodetectors 48a convert the received laser beams, in consonance with their light quantities, into focus control signals and tracking control signals.

In the optical pickup device 40, the laser beams are separated by the beam splitter 5, and while passing through the astigmatism generation element 6 of the prism 2, the focal lengths of the laser beams are changed to obtain two intersecting cross sections that include light axes. For one cross section, the focal point is in front of the light receiver 48, and for the other cross section, the focal point is to the rear of the light receiver 48. Further, the laser beams are received by the photodetectors 48a of the light receiver 48, which actually has the same function as the light receiver 8. Therefore, the spot formed by the laser beams on the light receiver 48, required for the focus control signal, has the same appropriate shape as was explained in the first embodiment. Therefore, a satisfactory focus control signal is obtained. Furthermore, a thin astigmatism generation element 6 can be prepared, and the distance between the prism 2 and the light receiver 48 can be reduced.

In addition, in the optical pickup device 40, when laser beams are divided by the diffraction element 41 and reflected by the optical disk 7, and the reflected laser beams are received by the photodetectors 48a of the light receiver 48, a tracking control signal is obtained.

According to the third embodiment, laser beams emitted by the laser source 1 have been transmitted through the beam splitter 5, unchanged, toward the optical disk 7. However, part of each of the laser beams emitted by the laser source 1 may be reflected, and the fore-light monitor 47 may be located on the side face opposite the light receiver 48 of the prism 2. In this case, the polarizing separation film of the reflection mirror 42 should be a total reflection film.

As described above, in the third embodiment, since the astigmatism generation element 6 is shaped like a Fresnel lens, the thickness of the astigmatism generation element 6 can be reduced, and the optical pickup device can be compactly made. Further, although the device is small, a satisfactory sensitivity can be obtained for a focusing control signal. Furthermore, since the step depth d is designated as a value of a natural number times either the wavelength $\lambda 1$ or $\lambda 2$, a spot 18 having in an appropriate shape can be formed on the light receiver 48 by a laser beam that has passed through the astigmatism generation element 6 and that has a wavelength which was employed to designate the step depth.

Fourth Embodiment

Figure 13A:
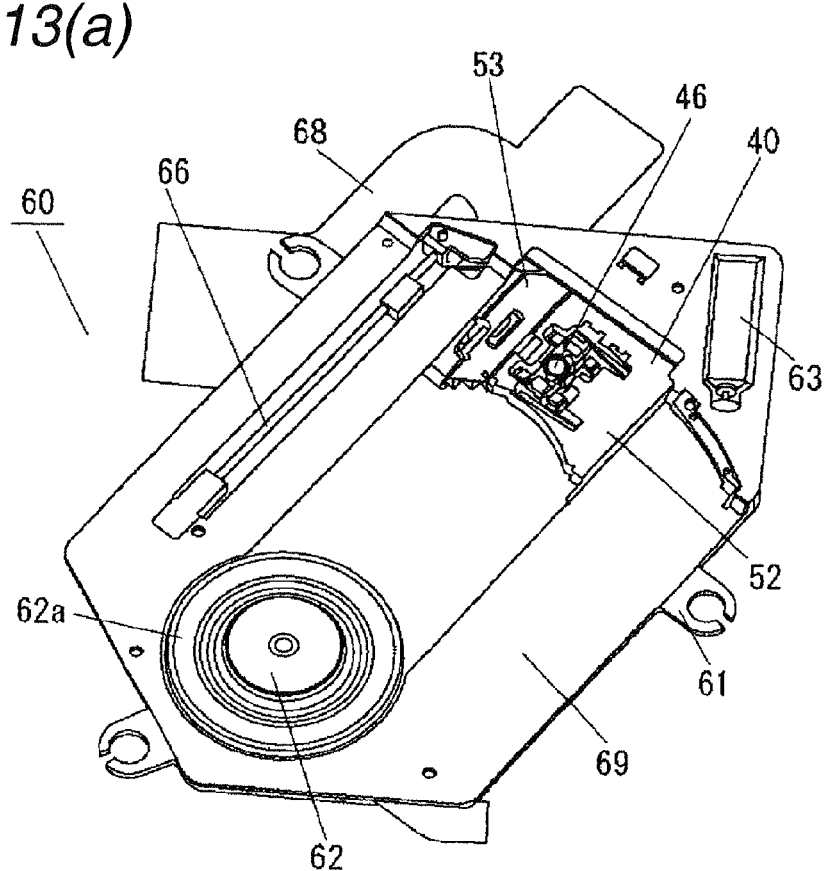
FIGS. 13A and 13B are diagrams showing the structure of an optical pickup module according to a fourth embodiment of the present invention.
Figure 13B:
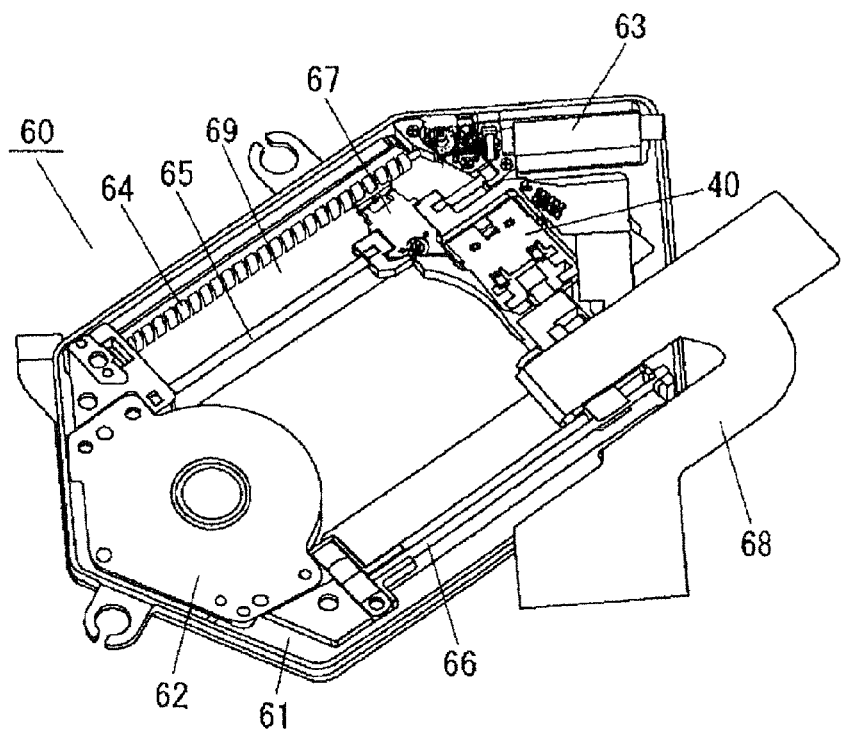
Figure 14:
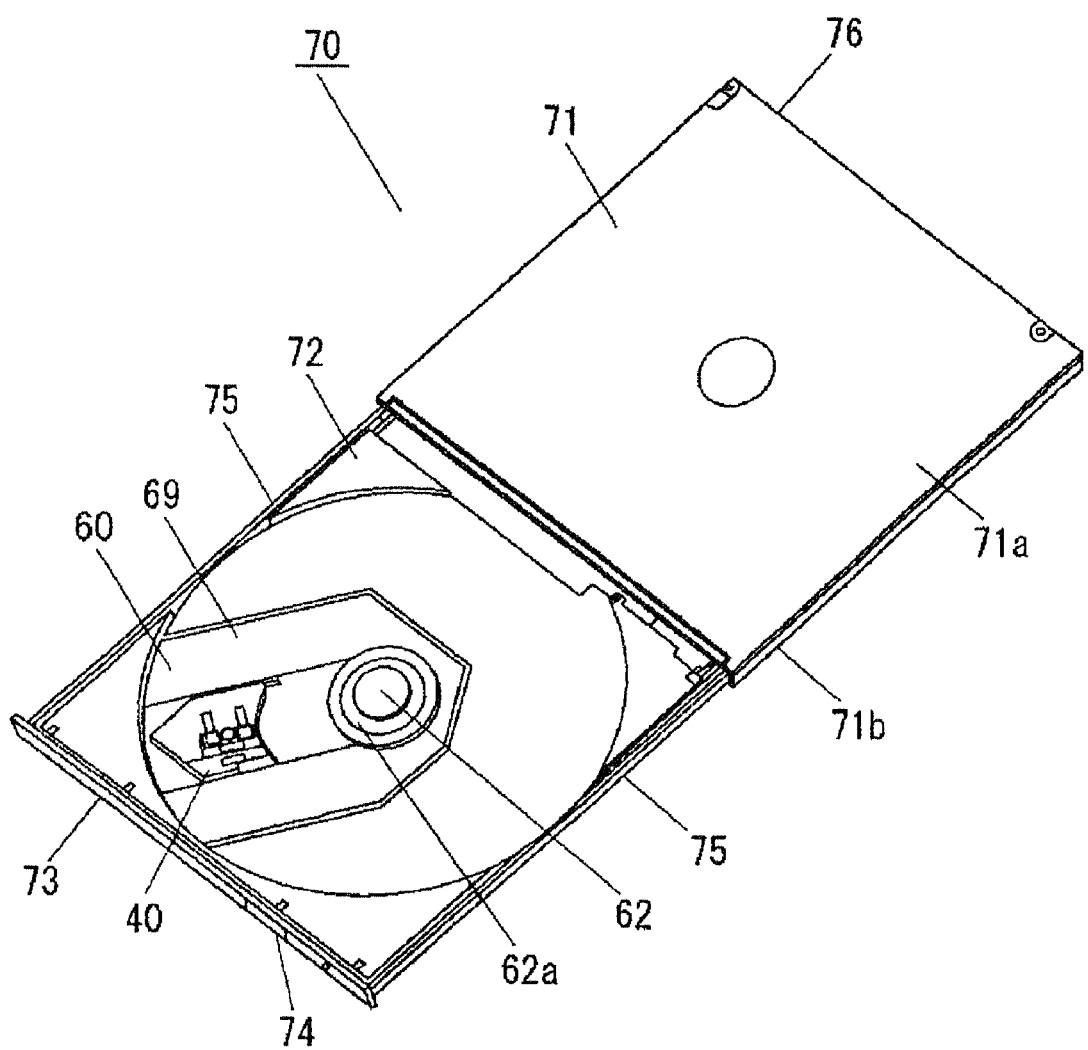
FIG. 14 is a diagram showing the structure of an optical disk drive according to the fourth embodiment.

A fourth embodiment of this invention will now be described. FIGS. 13A and 13B are diagrams showing the structure of an optical pickup module according to the fourth embodiment, and FIG. 14 is a diagram showing the structure of an optical disk drive according to the fourth embodiment.

In FIGS. 13A and 13B, an optical pickup module 60 is the drive mechanism of an optical disk drive 70 that includes: a rotary unit, for rotating an optical disk 7; and a moving unit, for moving an optical pickup device 40 towards or away from the rotary unit. A base 61 is the frame of the optical pickup module 60, and various components are mounted directly or indirectly on the base 61 to provide the optical pickup module 60.

The rotary unit is a spindle motor 62 having a turntable 62a on which an optical disk 7 is to be mounted. The spindle motor 62 is fixed to the base 61, and generates a rotational force for rotating the optical disk 7.

The moving unit includes a feed motor 63, a screw shaft 64 and guide shafts 65 and 66. The feed motor 63 is fixed to the base 61, and generates a rotational force with which the optical pickup device 40 is moved between the inner circumference and the outer circumference of the optical disk 7. A stepping motor or a DC motor is employed as the feed motor 63. A spiral groove is formed in the screw shaft 64, which is connected directly to the feed motor 63 or through several gears. In this embodiment, the screw shaft 64 is connected, using gears, to the feed motor 63. Each of the guide shafts 65 and 66 is fixed at both ends to the base 61 by holding members, and movably supports the optical pickup device 40. The optical pickup device 40 includes a rack 67 having guide teeth that engage the groove of the screw shaft 64. The rack 67 changes, to a linear drive force, the rotational force of the screw shaft 64 received from the feed motor 63, and in accordance with this force, the optical pickup device 40 can be moved between the inner circumference and the outer circumference of the optical disk 7.

The structure of the rotary unit is not limited to that as explained in the fourth embodiment, so long as the optical disk 7 is rotated at a predetermined speed. Furthermore, the structure of the moving unit is also not limited to that as explained in the fourth embodiment, so long as the optical pickup device 40 can be moved between the inner circumference and the outer circumference of the optical disk 7.

The optical pickup device 40 has the structure shown in FIG. 10, with the cover 53 attached. In the optical pickup device 40, an astigmatism generation element 6 is located between a beam splitter 5 and light receiver 48. The astigmatism generation element 6 generates laser beams having wavelengths $\lambda 1$ and $\lambda 2$ that are used for focusing control, while a focal position for one of two intersecting cross sections that include the light axes of the laser beams is defined as the front of the light receiver 48, and a focal position for the other cross section is defined as the rear of the light receiver 48. The astigmatism generation element 6 is an optical element having a Fresnel lens shape, whose step depth d is almost a natural number times either the wavelength $\lambda 1$ or $\lambda 2$. Therefore, a thin astigmatism generation element 6 can be prepared, and the optical pickup device 40 can be compactly constructed. Further, although the device 40 is small, appropriate sensitivity can be obtained for a focusing control signal. Furthermore, a spot having a satisfactory shape can be formed on the light receiver 48 by a laser beam, for which the step depth d is designated as being almost a natural number times the wavelength. Therefore, appropriate focusing control can be provided by a small optical pickup device 40. Further, the adjustment mechanism included in the holding member is employed to adjust the inclination of the guide shafts 65 and 66, so that the laser beams output by the objective lens 46 of the optical pickup device 40 enter the optical disk 7 at a right angle.

An FPC 68 electrically connects the optical pickup device 40 to the main body of the optical disk drive 70. The FPC 68 is a conductive line for supplying power and for transmitting an electric signal from the main body of the optical disk drive 70 to the optical pickup device 40, and is also a conductive line for transmitting an electric signal from the optical pickup device 40 to the main body of the optical disk drive 70.

A cover 69 has an opening, through which the objective lens 46 of the optical pickup device 40 and a turntable 62a of the spindle motor 62 are to be exposed. Further, in the fourth embodiment, the feed motor 63 and part of the guide shaft 66 are also exposed through the opening, so that the optical pickup module 60 can be thinned an amount equal to the thickness of the cover 69.

In FIG. 14, a case 71 is provided by using screws to securely assemble an upper case 71a and a lower case 71b. An ejectable tray 72 is attached to the case 71, and the optical pickup module 60 is mounted on the tray 72 from below. The tray 72 has an opening through which the objective lens 46 and at least part of the turntable 62a of the spindle motor 62 and the cover 69 are exposed. A bezel 73 is located at the front end face of the tray 72, and closes the ejection port of the tray 72 when the tray 72 is stored in the case 71. An ejection switch 74 is formed on the bezel 73. When the ejection switch 74 is pressed, the tray 72 is disengaged from the case 71, and can be ejected from, or inserted into the case 71. Rails 75 are slidably formed on both sides of the tray 72 and on the case 71. Circuit boards (not shown) are arranged inside the case 71 and the tray 72, and signal processing ICs and power circuits are mounted. An external connector 76 is connected to a power/signal line provided for an electronic apparatus, such as a computer. And through the external connector 76, power is supplied to the optical disk drive 70, an external electric signal is transmitted to the optical disk drive 70, or an electric signal generated by the optical disk drive 70 is transmitted to the electronic apparatus.

Figure 15:
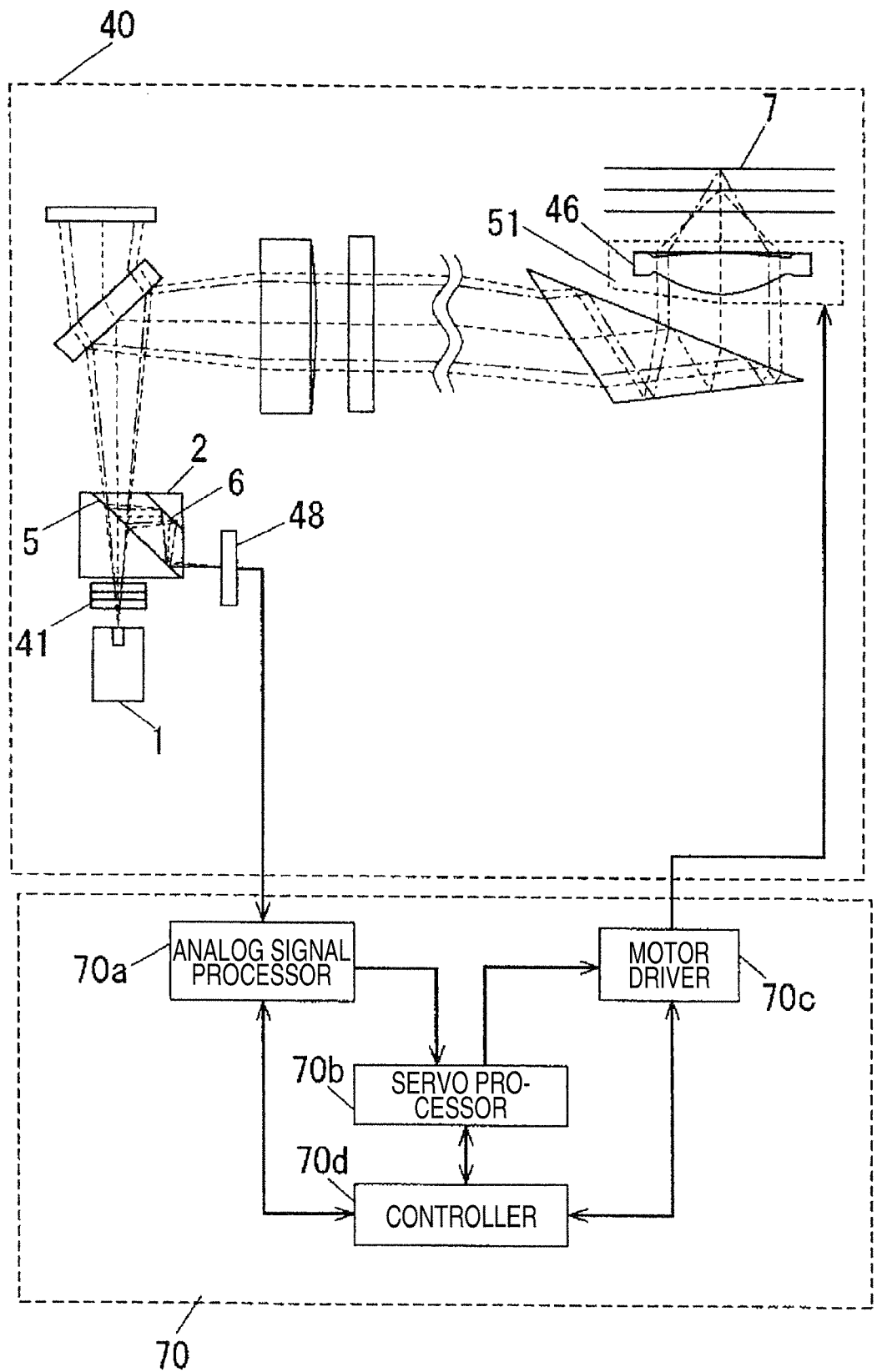
FIG. 15 is a diagram showing the control processing performed by the optical pickup device of the fourth embodiment.

The focusing control processing and tracking control processing performed by the optical pickup device 40 will now be described. FIG. 15 is a diagram used to illustrate the control provided by the optical pickup device according to the fourth embodiment. The DVD laser beam having the wavelength λ1 and the CD laser beam having the wavelength λ2, emitted by the laser source 1, are separated by the diffraction element 41 into beams used for tracking control, and the beams enter the optical disk 7. The laser beams reflected by the optical disk 7 are separated by the beam splitter 5 of the prism 2, and are then changed by the astigmatism generation element 6 into lights having different focal lengths that are provided for two intersecting cross sections that include the light axes. The resultant laser beams enter the light receiver 48, and after entering, are converted into electric signals for DVD focusing control, CD focusing control, DVD tracking control and CD tracking control that are transmitted to an analog signal processor 70a, which is arranged on the circuit board (not shown) of the optical disk drive 70.

The analog signal processor 70a performs computation and band processing for the received signals, and transmits the obtained signals to a servo processor 70b. Based on the signals received from the analog signal processor 70a, the servo processor 70b generates a focus error signal FES and a tracking error signal TES, and transmits these signals to a motor driver 70c. The motor driver 70c employs the focus error signal FES and the tracking error signal TES to generate a current for driving the objective lens driver 51 on which the objective lens 46 is mounted. Through this processing, shifts in the focus of light fluxes that are condensed on the optical disk 7 and shifts relative to a track can be minimized.

Furthermore, a controller 70d receives signals from the analog signal processor 70a, the servo processor 70b and the motor driver 70c. The controller 70d computes these signals, transmits the computation results (signals) to the individual sections, and permits the sections to perform driving or processing.

As described above, since the optical disk drive 70 of the fourth embodiment includes the optical pickup device 40 of the third embodiment, the optical disk drive 70 can be made compactly and can provide appropriate focusing control.

Fifth Embodiment

Figure 16:
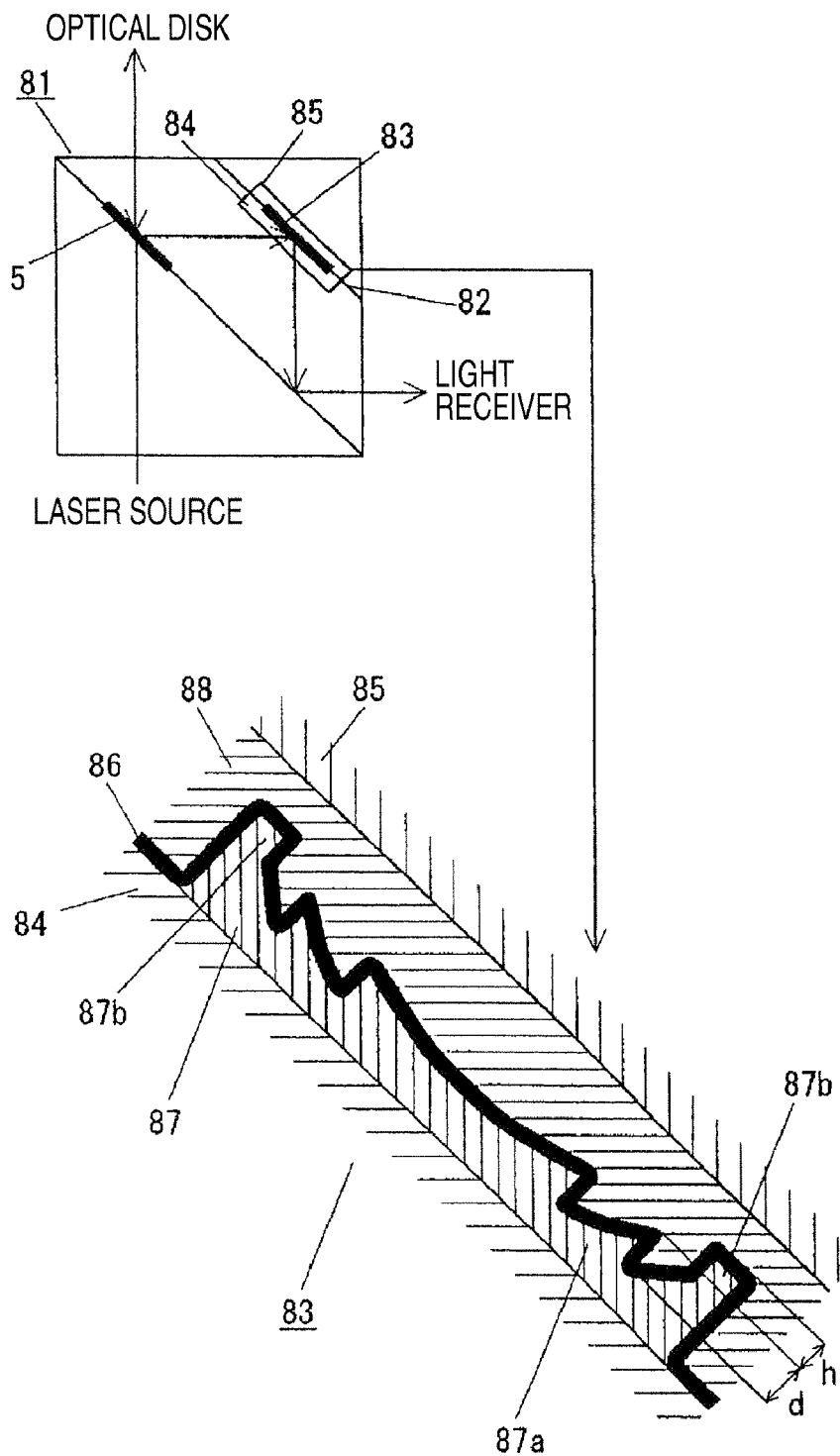
FIG. 16 is a diagram showing an example structure of a prism and an enlarged structure of an astigmatism generation element according to a fifth embodiment of the present invention.
Figure 17:
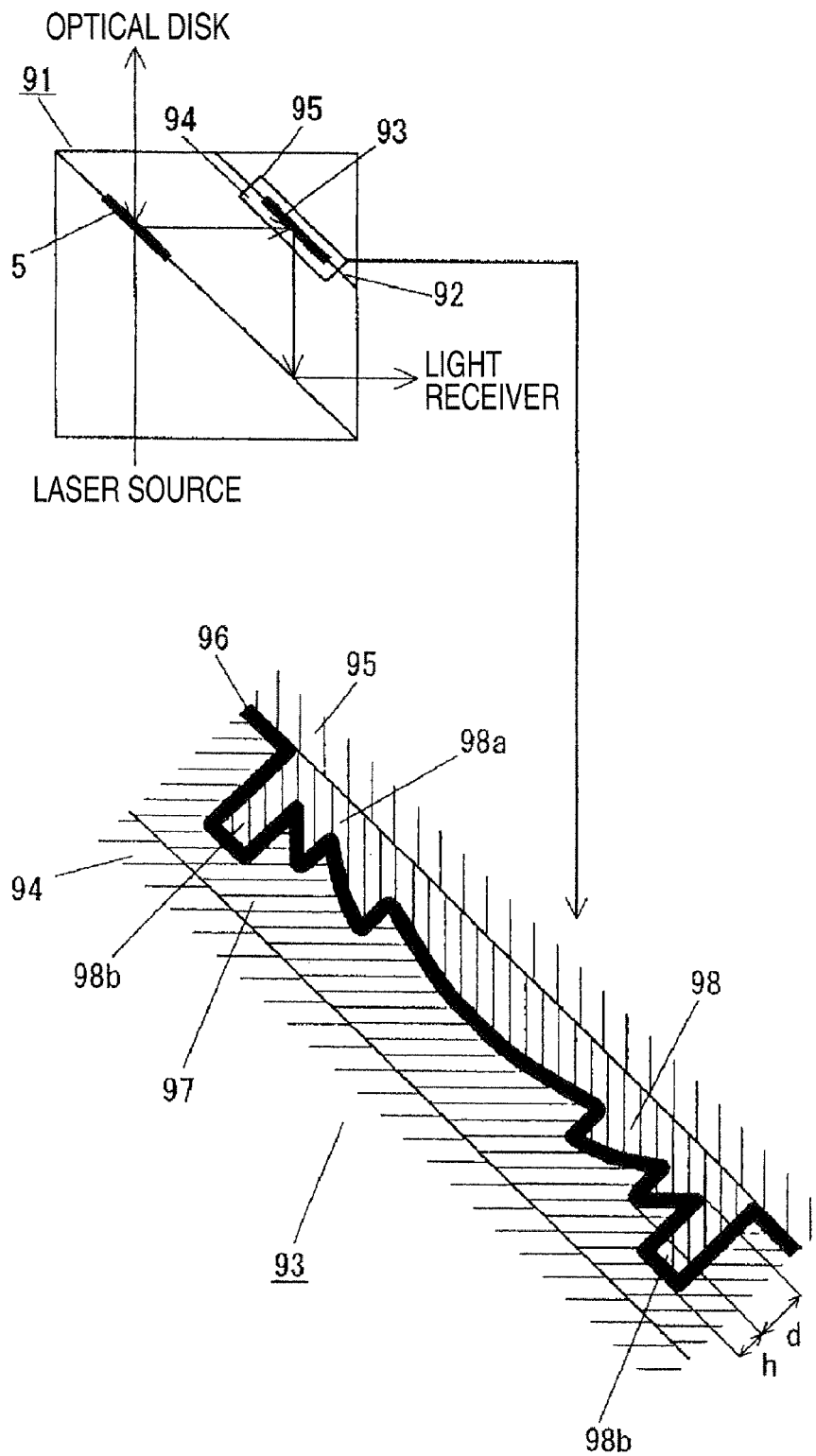
FIG. 17 is a diagram showing another example structure for the prism and the enlarged structure of an astigmatism generation element according to the fifth embodiment.
Figure 18:
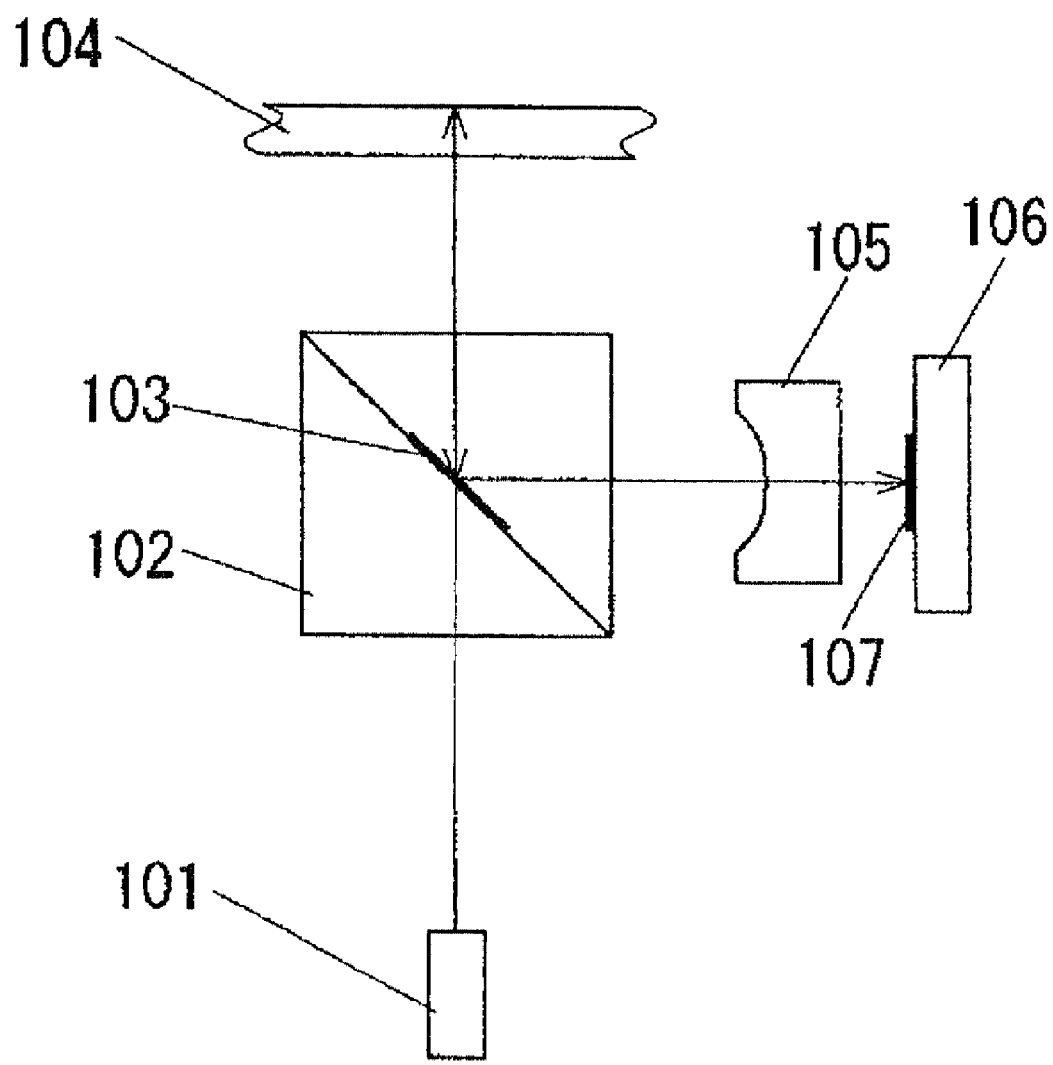
FIG. 18 is a diagram showing the structure of the essential portion of the optical system of a conventional optical pickup device.
Figure 19A:
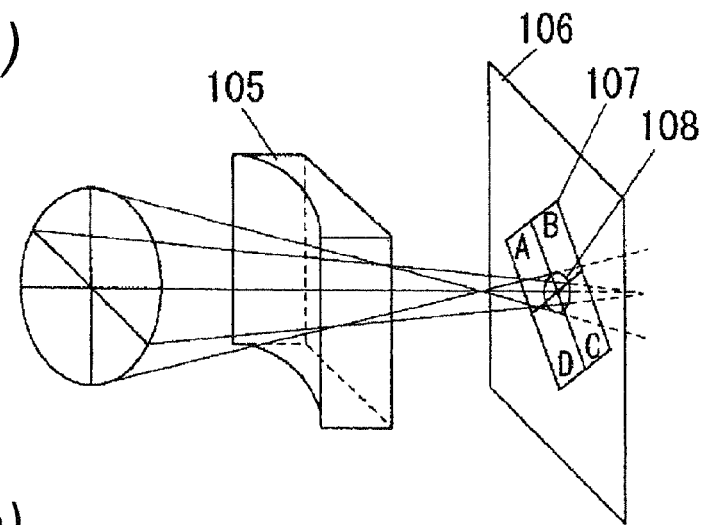
FIG. 19A is an explanatory diagram for a conventional detection lens.
Figure 19B:
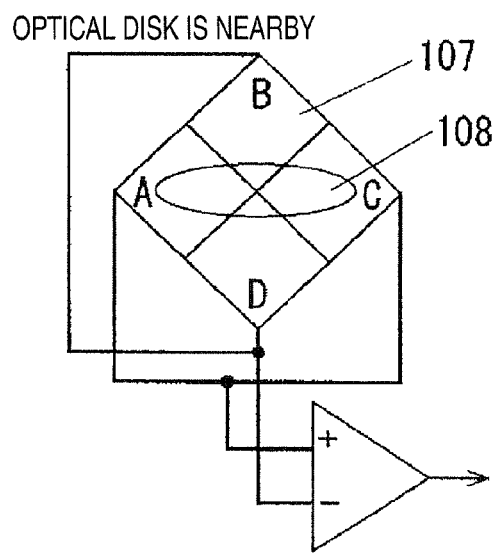
FIG. 19B is a diagram showing the state of a spot when an optical disk is located nearby.
Figure 19C:
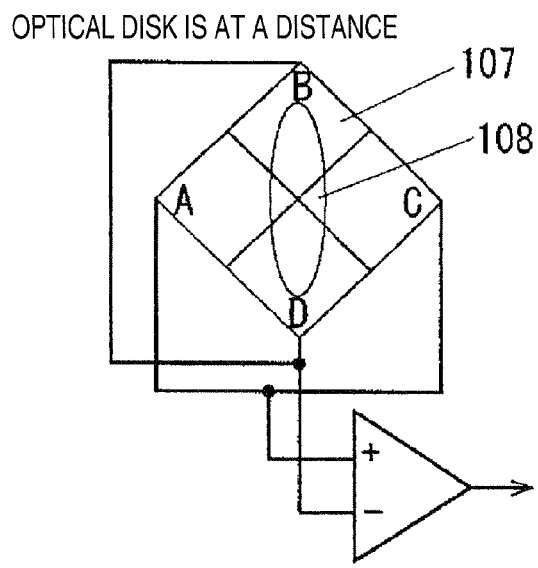
FIG. 19C is a diagram showing the state of a spot when the optical disk is located at a distance.

A fifth embodiment of the present invention will now be described while referring to the drawings. FIG. 16 is a diagram showing an example structure of a prism and the enlarged structure of an astigmatism generation element according to the fifth embodiment. FIG. 17 is a diagram showing another example structure of the prism and the enlarged structure of the astigmatism generation element according to the fifth embodiment. Since a laser source, an optical disk and a light receiver for the fifth embodiment are the same as those for the first embodiment, the explanation provided for the first embodiment will be quoted, and the reference numerals provided in the first embodiment will also be employed.

In FIG. 16, an astigmatism generation element 83 is formed inside a prism 81. Since a beam splitter 5 of the prism 81 is the same as the beam splitter 5 of the prism 2, the explanation provided for the beam splitter 5 of the prism 2 is quoted. The astigmatism generation element 83 is a reflection mirror having the shape of a Fresnel lens, and a step depth d is designated as a natural number times either a wavelength λ1 or λ2. A first block 84 and a second block 85, which are made, for example, of optical glass, such as BK7, are bonded together along a slope 82 of the prism 81. The laser beams having the wavelengths λ1 and λ2 that are reflected by an optical disk 7 are passed through the first block 84. A first resin 87 is a photosensitive resin for lithography, such as a photoresist or a photosensitive polyimide resin. The reflection face having the shape of the Fresnel lens of the astigmatism generation element 83 is formed by using the first resin 87. A reflection coating 86 is a metallic film or a dielectric multilayer film, which is deposited along the surface shape of the first resin 87. Further, an absorption film (not shown), which is a dielectric multilayer film, is deposited on the surface of the reflection coating 86. A second resin 88 is an adhesive use to bond the first block 84 to the second block 85, and for this, an ultraviolet curing adhesive, a thermosetting adhesive or an anaerobic adhesive, for example, is employed.

The following method is employed for fabricating the astigmatism generation element 83. A gray scale mask that can be exposed in a predetermined shape is prepared in advance. First, the first resin 87 is applied to the surface of the plate-like first block 84, and is cured. Then, ultraviolet irradiation/exposure and developing are performed through the gray scale mask, with which a predetermined concave-convex pattern, having ring zones and steps, can be formed. As a result, a concave-convex pattern having a predetermined shape is maintained on the first resin 87. This concave-convex pattern having the predetermined shape serves as a reflection face that has a Fresnel lens shape. During the fabrication of the astigmatism generation element 6, etching is further performed to form a concave-convex pattern having a predetermined shape on the surface of the first block 84. However, the etching process is not required for the fabrication of the astigmatism generation element 83.

Following this, the reflection coating 86 is deposited on the surface of the concave-convex pattern having the predetermined shape that is provided by using the first resin 87 on the first block 84. Further, the absorption film is formed on the surface thereof. Finally, the first block 84 and the second block 85 are bonded together by the second resin 88. Thereafter, the same process as that for the prism 2 is performed, and the prism 81 is completed.

As described above, since a photosensitive resin for lithography is employed for the first resin 87, the lithography technique for performing exposure and developing through a mask can be employed, and thus, a very accurate shape can be obtained for the reflection face. In addition, after the exposure and developing have been performed through the gray scale mask, have been performed, the shape of the remaining surface of the first resin 87 is directly employed as the shape of the reflection face of the astigmatism generation element 83. In this manner, the reflection face, which has the Fresnel lens shape, of the astigmatism generation element 83 is provided using the first resin 87 that is sealed inside the prism 81. Therefore, compared with the shape of the reflection face that is formed on the first block 84 by etching the first resin 87 and the first block 84, the shape of the reflection face in this embodiment resembles more closely the shape of the gray scale mask, because the manufacturing processing does not require the etching step. In addition, since the process for forming the reflection face on the first block 84 using etching is eliminated, the astigmatism generation element 83 can be manufactured at a low cost. Further, the gray scale mask is a mask such that, depending on the location on the mask, the transmittance of mask portions that correspond to the ring zones is sequentially changed for light having a wavelength used for exposure. Therefore, almost contiguously shaped ring zones can be obtained without having to repeat the exposure multiple times. Further, since the exposure is required only once, the surface shape of an optical element like a Fresnel lens resemble very closely a designed shape.

Moreover, the laser beams having the wavelengths $\lambda 1$ and $\lambda 2$ pass through the first block 84, the first resin 87, which is a lithography photosensitive resin, and are reflected by the reflection coating 86, and again pass through the first resin 87 and the first block 84. When the laser beams pass through the first resin 87, there is a probability that the qualities of the laser beams will be adversely affected due to slight differences in the refractive index between the first block 84 and the first resin 87, or due to very tiny air bubbles. Therefore, the refractive indexes of the first block 84 and the first resin 87 should be substantially equal for the wavelengths $\lambda 1$ and $\lambda 2$, so that the laser beams having the wavelengths $\lambda 1$ and $\lambda 2$ avoid being reflected at the boundary of the first block 84 and the first resin 87, and almost all the light quantity passes through. Thus, since there is almost no light reflected at the boundary of the first block 84 and the first resin 87 and enters the light receiver 8, a preferable recording and reproduction characteristic is obtained. It is also preferable that the first resin 87 be completely deaired, so that the first resin 87 does not contain very tiny bubbles.

Further, the step depth d of the reflection face, which has the Fresnel lens shape, of the astigmatism generation element 81 is several μm. Actually, since the step depth d is frequently 1 μm or smaller, the reflection face is deformed simply by contacting another component, and the shape collapses. When, for example, the reflection face contacts the second block 85 because the first and second blocks 84 and 85 are pressed together too closely for adhesion, this causes the reflection face to be deformed. And since the first resin 87 is softer than glass, this deformation is especially remarkable. Therefore, to avoid such a contact, the surface of the photosensitive resin in an area 87a, which corresponds to an area where the laser beams having the wavelengths $\lambda 1$ and $\lambda 2$ are to be reflected, is lower by a height h than the surface of a peripheral area 87b. As a result, the shape of the reflection face provided using the first resin 87 can be used as the shape of the reflection face of the astigmatism generation element 81, without collapsing.

Furthermore, the lithography photosensitive resin is not always strong and resistant to water. For example, when water enters the resin, the optical characteristic is changed and the refractive index is varied, or the adhesion of the resin to the first block 84 or the second block 85 is reduced and causes the resin to peel, so that the reliability is deteriorated. According to the fifth embodiment, as shown in FIG. 16, the first resin 87, which is a lithography photosensitive resin, is arranged so as not to be exposed outside the prism 81, and is covered with the reflection coating 86. Therefore, the first resin 87 can be protected from water that enters directly from the outside. Especially since the reflection coating 86 can block water, so long as the first resin 87 is covered with this reflection coating 86, better protection of the first resin 87 from the entry of water is ensured. Thus, for the first resin 87, a high reliability can be maintained.

In FIG. 17, like the prism 83, an astigmatism generation element 93 is formed inside a prism 91. Since a beam splitter 5 of the prism 91 is the same as the beam splitter 5 of the prism 2, the explanation provided for the beam splitter 5 of the prism 2 is quoted. The astigmatism generation element 93 is a reflection mirror having the shape of a Fresnel lens, and a step depth d is designated as a natural number times either a wavelength $\lambda 1$ or $\lambda 2$. A first block 94 and a second block 95, which are made, for example, of optical glass, such as BK7, are bonded together along a slope 92 of the prism 91. The laser beams having the wavelengths $\lambda 1$ and $\lambda 2$ that are reflected by an optical disk 7 are passed through the first block 94. A second resin 98 is a photosensitive resin for lithography, such as a photoresist or a photosensitive polyimide resin. The reflection face having the shape of the Fresnel lens of the astigmatism generation element 93 is formed by using the second resin 98. An absorption film (not shown), which is a dielectric multilayer film, is formed on the surface of the second resin 98. A reflection coating 96 is a metallic film or a dielectric multilayer film, which is deposited along the surface shape of the second resin 98. A first resin 97 is an adhesive use to bond the first block 94 to the second block 95, and for this, an ultraviolet curing adhesive, a thermosetting adhesive or an anaerobic adhesive, for example, is employed.

The same method as used for the astigmatism generation element 83 is employed for fabricating the astigmatism generation element 93, and is performed as follows. First, the second resin 98 is applied to the surface of the plate-like second block 95, and is cured. Then, ultraviolet irradiation/exposure and developing are performed through the gray scale mask, with which a predetermined concave-convex pattern, having ring zones and steps, can be formed. As a result, a concave-convex pattern having a predetermined shape is maintained on the second resin 98. This concave-convex pattern having the predetermined shape serves as a reflection face that has a Fresnel lens shape. Following this, an absorption film is deposited on the surface of the concave-convex pattern having the predetermined shape that is provided by using the second resin 98 on the second block 95. Further, the reflection coating 96 is overlaid. Finally, the first block 94 and the second block 95 are bonded together by the first resin 97. Thereafter, the same process as that for the prism 2 is performed, and the prism 91 is completed.

As described above, since a photosensitive resin for lithography is employed for the second resin 98, the lithography technique for performing exposure and developing through a mask can be employed, and thus, a very accurate shape can be obtained for the reflection face. In addition, after the exposure and developing have been performed through the gray scale mask, have been performed, the shape of the remaining surface of the second resin 98 is directly employed as the shape of the reflection face of the astigmatism generation element 93. In this manner, the reflection face, which has the Fresnel lens shape, of the astigmatism generation element 93 is provided using the second resin 98 that is sealed inside the prism 91. Therefore, compared with the shape of the reflection face that is formed on the second block 95 by etching the second resin 98 and the second block 95, the shape of the reflection face in this embodiment resembles more closely the shape of the gray scale mask, because the manufacturing processing does not require the etching step. In addition, since the process for forming the reflection face on the second block 95 using etching is eliminated, the astigmatism generation element 93 can be manufactured at a low cost. Further, the gray scale mask is a mask such that, depending on the location on the mask, the transmittance of mask portions that correspond to the ring zones is sequentially changed for light having a wavelength used for exposure. Therefore, almost contiguously shaped ring zones can be obtained without having to repeat the exposure multiple times. Further, since the exposure is required only once, the surface shape of an optical element like a Fresnel lens resemble very closely a designed shape.

Moreover, the laser beams having the wavelengths $\lambda 1$ and $\lambda 2$ pass through the first block 94, the first resin 97, which is an adhesive, and are reflected by the reflection coating 86, and again pass through the first resin 97 and the first block 94. At this time, the refractive indexes of the first block 94 and the first resin 97 should be substantially equal for the wavelengths λ1 and λ2, so that the laser beams having the wavelengths λ1 and λ2 avoid being reflected at the boundary of the first block 94 and the first resin 97, and almost all the light quantity passes through. Thus, since there is almost no light reflected at the boundary of the first block 94 and the first resin 97 and enters the light receiver 8, a preferable recording and reproduction characteristic is obtained. It is also preferable that the first resin 97 be completely deaired, so that the first resin 97 does not contain very tiny bubbles. Additionally, it is also preferable that, when the first resin 97 is applied, tiny air bubbles not be contained between the reflection coating 96 and the first resin 97.

Further, as well as the reflection face of the astigmatism generation element 81, the step depth d of the reflection face, which has the Fresnel lens shape, of the astigmatism generation element 93 is deformed simply by contacting another component, and the shape collapses. When, for example, the reflection face contacts the first block 94 because the first and second blocks 94 and 95 are pressed together too closely for adhesion, this causes the reflection face to be deformed. And since the second resin 98 is softer than glass, this deformation is especially remarkable. Therefore, to avoid such a contact, the surface of the photosensitive resin in an area 98a, which corresponds to an area where the laser beams having the wavelengths λ1 and λ2 are to be reflected, is lower by a height h than the surface of a peripheral area 98b. As a result, the shape of the reflection face provided using the second resin 98 can be used as the shape of the reflection face of the astigmatism generation element 93, without collapsing.

Furthermore, as shown in FIG. 17, the second resin 98, which is a lithography photosensitive resin, is arranged so as not to be exposed outside the prism 91, and is covered with the reflection coating 96. Therefore, the second resin 98 can be protected from water that enters directly from the outside. Especially since the reflection coating 96 can block water, so long as the second resin 98 is covered with this reflection coating 96, better protection of the second resin 98 from the entry of water is ensured. Thus, for the second resin 98, a high reliability can be maintained.

As described above, according to the fifth embodiment, since the astigmatism generation element 83 or 93 is shaped like a Fresnel lens, the thickness of the element 83 or 93 can be reduced, and a compact optical pickup device can be provided. Further, although the device is small, appropriate sensitivity can be obtained for a focusing control signal. Furthermore, since the step depth is designated as natural number times the wavelength λ1 or λ2, a spot having a satisfactory shape can be formed on the light receiver 8 by a laser beam that has passed through the astigmatism generation element 83 or 93 and that has the wavelength employed to designate the step depth. In addition, in this embodiment, the reflection face, which has the Fresnel lens shape, of the astigmatism generation element 83 or 93 is formed by using the resin that is enclosed within the prism 81 or 91. That is, the surface shape of the remaining resin, after the exposure and developing processes performed through a mask are completed, is employed directly as the shape of the reflection face of the astigmatism generation element 83 or 93. Therefore, compared with the shape of the reflection face formed on the block by etching the resin and the block, the shape of the reflection face resembles more closely the shape of a mask, because the etching step is eliminated. Further, since the process for forming the reflection face on the block using etching is eliminated, the astigmatism generation element 83 or 93 can be fabricated at a low cost.

This application is based upon and claims the benefit of priority of Japanese Patent Application No 2006-242461 filed on Jun. 9, 2007 and Japanese Patent Application No 2006-306361 filed on Jun. 11, 13, the contents of which are incorporated herein by reference in its entirety.

What is claimed is:

1. An optical pickup device, comprising:
 a laser source for emitting, to an optical disk, a laser beam having a wavelength λ1 and a laser beam having a wavelength λ2, which is longer than the wavelength λ1;
 a light receiver, for receiving laser beams having the wavelength λ1 and the wavelength λ2 that are reflected by the optical disk;
 a beam splitter, for directing, to the light receiver, the laser beams having the wavelength λ1 and the wavelength λ2 that are reflected by the optical disk; and
 an astigmatism generation element, located between the beam splitter and the light receiver, for generating the laser beams having the wavelength λ1 and the wavelength λ2, which are to be used for focusing control, by designating as the front of the light receiver a focal point on one of the intersecting cross sections that include the light axes of the laser beams, and by designating as the rear of the light receiver, a focal point on the other cross section,
 wherein the astigmatism generation element is an optical element, which is like a Fresnel lens, whose step depth is substantially a natural number times either the wavelength λ1 or the wavelength λ2.

2. The optical pickup device according to claim 1, wherein the step depth is almost a natural number times the wavelength λ1 and wavelength λ2.

3. The optical pickup device according to claim 2, wherein the optical disk is a DVD or a CD, and wherein the laser beam having the wavelength λ1 is a laser beam emitted for a DVD, and the laser beam having the wavelength λ2 is a laser beam emitted for a CD.

4. The optical pickup device according to claim 1, wherein the step depth is the smallest value of the natural number times the wavelength λ1 and of the wavelength λ2.

5. The optical pickup device according to claim 1, further comprising:
 a prism having a plurality of slopes internally,
 wherein the beam splitter is formed on one of the slopes of the prism, and the astigmatism generation element is formed on a different one of the slopes.

6. The optical pickup device according to claim 5, wherein the laser beams having the wavelength λ1 and the wavelength λ2, reflected on the optical disk, enter the plurality of slopes at an incident angle of almost 45°.

7. The optical pickup device according to claim 5, wherein the astigmatism generation element is a reflection mirror that employs ring zones to reflect the laser beams having the wavelength λ1 and the wavelength λ2 that are reflected by the optical disk.

8. The optical pickup device according to claim 7, wherein, after the laser beams having the wavelengths λ1 and λ2 are forwarded to the light receiver by the beam splitter, the laser beams are reflected by the astigmatism generation element and are reflected again on the slope where the beam splitter is formed, and the resultant beams are forwarded to the light receiver.

9. The optical pickup device according to claim 7, wherein the astigmatism generation element is formed on a surface of a medium that permits the laser beams to pass, the laser beam having the wavelengths λ1 and λ2 and being reflected by the optical disk.

10. The optical pickup device according to claim 9, wherein a surface of the medium in an area corresponding to an area that reflects the laser beams having the wavelengths $\lambda 1$ and $\lambda 2$ is lower than a surface of a peripheral area.

11. The optical pickup device according to claim 5, wherein, in the optical element having the shape of the Fresnel lens shape and that serves as the astigmatism generation element, ring zones and steps are arranged in a cross shape, viewed in an incident direction of the laser beams having the wavelengths $\lambda 1$ and $\lambda 2$ and that are reflected by the optical disk.

12. The optical pickup device according to claim 1, further comprising:

a prism having internally a slope, wherein the beam splitter is formed on the slope of the prism, and the astigmatism generation element is formed between the light receiver and a face of the prism from which the laser beams having the wavelengths $\lambda 1$ and $\lambda 2$, which have been directed forward to the light receiver by the beam splitter and which have been reflected by the optical disk, are output.

13. The optical pickup device according to claim 12, wherein the astigmatism generation element is formed on a face of the prism, from which the laser beams having the wavelengths $\lambda 1$ and $\lambda 2$, which were reflected by the optical disk, are output.

14. The optical pickup device according to claim 12, wherein the astigmatism generation element is a lens that employs ring zones to refract and permit the laser beams to pass, the laser beams having the wavelengths $\lambda 1$ and $\lambda 2$ and being reflected by the optical disk.

15. The optical pickup device according to claim 1, wherein the step depth is equal to or greater than 0.1 μm, and equal to or smaller than 3.0 μm.

16. The optical pickup device according to claim 1, wherein the step depth is almost a natural number times the wavelength $\lambda 1$ and the wavelength $\lambda 2$, and wherein the natural number times includes for the step depth are values that at least include those obtained by using a natural number ±0.25.

17. The optical pickup device according to claim 1, wherein the ring zones of the optical element having the Fresnel lens shape are formed by an exposure performed using a gray scale mask, for which distribution of a transmittance is substantially contiguous for light having a wavelength used for the exposure.

18. An optical disk drive comprising:

a laser source for emitting, to an optical disk, a laser beam having a wavelength $\lambda 1$ and a laser beam having a wavelength $\lambda 2$, which is longer than the wavelength $\lambda 1$;

a light receiver, for receiving laser beams having the wavelength $\lambda 1$ and the wavelength $\lambda 2$ that are reflected by the optical disk;

a beam splitter, for directing, to the light receiver, the laser beams having the wavelength $\lambda 1$ and the wavelength $\lambda 2$ that are reflected by the optical disk; and an astigmatism generation element, located between the beam splitter and the light receiver, for generating the laser beams having the wavelength $\lambda 1$ and the wavelength $\lambda 2$, which are to be used for focusing control, by designating as the front of the light receiver a focal point on one of the intersecting cross sections that include the light axes of the laser beams, and by designating as the rear of the light receiver, a focal point on the other cross section, wherein the astigmatism generation element is an optical element, which is like a Fresnel lens, whose step depth is substantially a natural number times either the wavelength $\lambda 1$ or the wavelength $\lambda 2$.

19. An optical pickup device comprising:

a laser source for emitting, to an optical disk, a laser beam having a wavelength $\lambda 1$ and a laser beam having a wavelength $\lambda 2$, which is longer than the wavelength $\lambda 1$;

a light receiver, for receiving laser beams having the wavelength $\lambda 1$ and the wavelength $\lambda 2$ that are reflected by the optical disk;

a beam splitter, for directing, to the light receiver, the laser beams having the wavelength $\lambda 1$ and the wavelength $\lambda 2$ that are reflected by the optical disk; and an astigmatism generation element, located between the beam splitter and the light receiver, for generating the laser beams having the wavelength $\lambda 1$ and the wavelength $\lambda 2$, which are to be used for focusing control, by designating as the front of the light receiver a focal point on one of the intersecting cross sections that include the light axes of the laser beams, and by designating as the rear of the light receiver, a focal point on the other cross section; and a prism internally including the astigmatism generation element, wherein the astigmatism generation element is an optical element, which is like a Fresnel lens, whose step depth is substantially a natural number times either the wavelength $\lambda 1$ or the wavelength $\lambda 2$, and wherein a reflection face in a Fresnel lens shape of the astigmatism generation element is formed using a resin sealed inside the prism.

20. The optical pickup device according to claim 19, wherein the prism includes a first block, through which the laser beams having the wavelengths $\lambda 1$ and $\lambda 2$ pass, a second block, arranged opposite the first block, a reflection coating, formed between the first block and the second block to reflect the laser beams having the wavelengths $\lambda 1$ and $\lambda 2$, a first resin, formed between the first block and the reflection coating, and a second resin, formed between the reflection coating and the second block; and wherein a reflection face of the astigmatism generation element has the same shape as a reflection coating that is formed along a surface shape of either the first resin or the second resin.

21. An optical pickup device according to claim 20, wherein a refractive index for the first block and a refractive index for the first resin are substantially equal for the wavelengths $\lambda 1$ and $\lambda 2$.

22. The optical pickup device according to claim 20, wherein the first resin formed on the first block is a photosensitive resin used for lithography, the reflection coating is arranged along the surface shape of the first resin, and the second resin is an adhesive for bonding together the first block and the second block.

23. The optical pickup device according to claim 22, wherein a surface of the photosensitive resin in an area corresponding to an area that reflects the laser beams having the wavelengths $\lambda 1$ and $\lambda 2$ is lower than a surface of a peripheral area.

24. The optical pickup device according to claim 22, wherein the photosensitive resin is not to be exposed outside the prism.

25. The optical pickup device according to claim 24, wherein the reflection coating covers the photosensitive resin.

26. The optical pickup device according to claim 20, wherein the second resin formed on the second block is a photosensitive resin used for lithography, the reflection coating is arranged along the surface shape of the second resin, and the first resin is an adhesive for bonding together the first block and the second block.

27. The optical pickup device according to claim 26, wherein a surface of the photosensitive resin in an area corresponding to an area that reflects the laser beams having the wavelengths $\lambda 1$ and $\lambda 2$ is lower than a surface of a peripheral area.

28. The optical pickup device according to claim 26, wherein the photosensitive resin is not to be exposed outside the prism.

29. The optical pickup device according to claim 28, wherein the reflection coating covers the photosensitive resin.

* * * * *